(12) United States Patent
Arafat Arafat

(10) Patent No.: US 12,048,320 B2
(45) Date of Patent: Jul. 30, 2024

(54) PROCESS FOR PREPARING HIGH DENSITY, THERMOSTABLE POLYSACCHARIDE BEADS AS FOOD ADDITIVES

(71) Applicant: DNA CATCHER, S.L, Navarra (ES)

(72) Inventor: Ola Arafat Arafat, Navarra (ES)

(73) Assignee: DNA CATCHER, S.L., Navarra (ES)

( * ) Notice: Subject to any disclaimer, the term of this patent is extended or adjusted under 35 U.S.C. 154(b) by 397 days.

(21) Appl. No.: 17/608,206

(22) PCT Filed: May 6, 2020

(86) PCT No.: PCT/EP2020/062573
§ 371 (c)(1),
(2) Date: Nov. 2, 2021

(87) PCT Pub. No.: WO2020/225299
PCT Pub. Date: Nov. 12, 2020

(65) Prior Publication Data
US 2022/0211092 A1 Jul. 7, 2022

(30) Foreign Application Priority Data
May 7, 2019 (EP) .................................... 19382345

(51) Int. Cl.
*A23P 10/30* (2016.01)
*A23L 27/00* (2016.01)
(Continued)

(52) U.S. Cl.
CPC ............... *A23P 10/30* (2016.08); *A23L 27/72* (2016.08); *A23L 33/135* (2016.08); *B01J 13/02* (2013.01)

(58) Field of Classification Search
CPC ......... A23P 10/30; B01J 13/02; A23L 33/135; A23L 27/72
See application file for complete search history.

(56) References Cited

U.S. PATENT DOCUMENTS

| 3,349,079 A | 10/1967 | Freedman |
| 3,352,688 A | 11/1967 | Messina |

(Continued)

FOREIGN PATENT DOCUMENTS

| EP | 2234711 | 11/2017 |
| EP | 2451300 | 9/2018 |

(Continued)

OTHER PUBLICATIONS

Afzal et al., The Structural, Crystallinity, and Thermal Properties of pH-responsive Interpenetrating Gelatin/Sodium Alginate-based Polymeric Composites for the Controlled Delivery of Cetirizine HCl. Turk J Pharm Sci. Apr. 2018;15(1):63-76.

(Continued)

*Primary Examiner* — Anthony J Weier
(74) *Attorney, Agent, or Firm* — Casimir Jones, SC; Tristan A. Fuierer

(57) ABSTRACT

The invention relates to a process for preparing very dense alginate gel beads including an active ingredient, and to the alginate gel beads obtainable by said process. Additionally, the invention also relates to a food product including these alginate gel beads and to the use of the alginate gel beads as a food additive. Also, the invention relates to a dry surface comprising the alginate gel beads of the invention, and to the use of the alginate gel beads for releasing a flavor or fragrance compound from a dry surface.

16 Claims, 9 Drawing Sheets

(51) Int. Cl.
A23L 33/135 (2016.01)
B01J 13/02 (2006.01)

(56) References Cited

U.S. PATENT DOCUMENTS

| | | | |
|---|---|---|---|
| 4,822,534 | A | 4/1989 | Lencki et al. |
| 4,948,575 | A | 8/1990 | Cole et al. |
| 5,004,595 | A | 4/1991 | Cherukuri et al. |
| 5,051,304 | A | 9/1991 | David et al. |
| 5,186,185 | A | 2/1993 | Mashiko et al. |
| 5,221,502 | A | 6/1993 | Washington |
| 5,690,990 | A | 11/1997 | Bonner |
| 5,759,599 | A | 6/1998 | Wampler et al. |
| 5,792,505 | A | 8/1998 | Fluger et al. |
| 5,795,606 | A | 8/1998 | Lapre et al. |
| 6,106,875 | A | 8/2000 | Soper et al. |
| 6,325,859 | B1 | 12/2001 | De Roos et al. |
| 6,436,461 | B1 | 8/2002 | Bouwmeesters et al. |
| 8,449,919 | B2 | 5/2013 | Shen et al. |
| 2003/0082272 | A1 | 5/2003 | Bouwmeesters et al. |
| 2004/0071780 | A1* | 4/2004 | Lillard .............. B01J 13/22 264/4 |
| 2004/0191366 | A1 | 9/2004 | Mangos et al. |
| 2006/0144412 | A1 | 7/2006 | Mishra et al. |
| 2010/0173002 | A1 | 7/2010 | Yulai et al. |
| 2011/0008493 | A1 | 1/2011 | Zorea |
| 2011/0081451 | A1 | 4/2011 | Siegel et al. |
| 2014/0302135 | A1 | 10/2014 | Durvasula et al. |

FOREIGN PATENT DOCUMENTS

| | | | |
|---|---|---|---|
| GB | 0310673.9 | | 5/2003 |
| WO | WO 91/19424 | | 12/1991 |
| WO | WO 1993/019622 | | 10/1993 |
| WO | WO 98/15192 | | 4/1998 |
| WO | WO 2004/098318 | | 11/2004 |
| WO | WO 2007/135583 | | 11/2007 |
| WO | WO2009/062254 | * | 5/2009 |
| WO | WO 2019/077052 | | 4/2019 |

OTHER PUBLICATIONS

Bajpai et al., Swelling and drug release behavior of calcium alginate/poly(sodium acrylate) hydrogel beads. Designed Monomers and Polymers. 2016. 19(1):89-98.
Bajpai et al., Investigation of swelling/degradation behaviour of alginate beads crosslinked with Ca2+ and Ba2+ ions. Reactive & Functional Polymers, 2004. 59:129-140.
Bekin et al., Dielectric, Thermal, and Swelling Properties of Calcium Ion-Crosslinked Sodium Alginate Film, Polymer Engineering and Science, 2014. 54:1372-1382.
Belalia et al., Investigation of swelling/adsorption behavior of calcium alginate beads. Rev Roum Chim, 2016. 61(10):747-754.
Bokkhim et al., Characterization of alginate-lactoferrin beads prepared by extrusion gelation method, Food Hydrocolloids, 2016. 53:270-276.
Campos et al., Polysaccharides as safer release systems for agrochemicals. Agron. Sustain. 2015. Dev. 35: 47-66.
Celli et al., Development and evaluation of floating alginate microspheres for oral delivery of anthocyanins—A preliminary investigation. Food Sci Nutr, 2017. 5:713-721.
Chan et al., Prediction models for shape and size of ca-alginate macrobeads produced through extrusion-dripping method, J Colloid Interface Science, 2009. 338:63-72.
Ching et al., Alginate gel particles—A review of production techniques and physical properties, Critical Reviews in Food Science and Nutrition, 2017. 57(6): 1133-1152.
Chuang et al., Effects of pH on the Shape of Alginate Particles and Its Release Behavior. International Journal of Polymer Science, vol. 2017, Article ID 3902704, 9 pages.
Darmokoesoemo et al., Novel drug delivery carrier from alginate-carrageenan and glycerol as plasticizer. Results in Physics. 2017. 7:2979-2989.
De Araújo Etchepare et al., Effect of resistant starch and chitosan on survival of Lactobacillus acidophilus microencapsulated with sodium alginate. LWT—Food Science and Technology, 2016. 65:511-517.
Deng et al., Drug release behaviors of a pH/temperature sensitive core-shelled bead with alginate and poly(N-acryloyl glycinates). Front. Mater. Sci. 2010. China,4(4):353-358.
Devi et al., Encapsulation of active ingredients in polysaccharide-protein complex coacervates, Advances in Colloid and Interface Science, 2016. 239:136-145.
Draget. Chapter 22: Alginates. In: Handbook of hydrocolloids. Edited by G.O. Phillips and P.A. Williams. Woodhead Publishing Limited and CRC Press. 2000. pp. 379-395.
Grant et al., Biological interactions between poly-saccharides and divalent cations: The egg-box model. Federation of European Biochemical Societies (FEBS) Letters, 1973. 32, 195-198.
Gurikov et al., Non-Conventional Methods for Gelation of Alginate. Gels, 2018. 4(1):14.
Herrero et al., Development of a new technology for the production of microcapsules based in atomization processes. Chemical Engineering Journal, 2006, vol. 117 (2): 137-142.
Holme et al., Thermal depolymerization of alginate in the solid state. Carbohydrate Polymers, 2003. 54:431-438.
Horvat et al., Thermal properties of polysaccharides aerogels. J Therm Anal Calorim, 2016. 127:363-370.
Kalgutkar et al., Method development and validation of menthol in cough syrup by gas chromatography, ACAIJ, 2016. 16(1): 001-006.
Kaushik et al., Role of excipients and polymeric advancements in preparation of floating drug delivery systems. International Journal of Pharmaceutical Investigation, 2015. 5(1):1-12.
Kim et al., Effect of microencapsulation on viability and other characteristics in Lactobacillus acidophilus ATCC 43121. LWT, 2008. 41:493-500.
Kumari et al., Comparative studies on physico-chemical characterization of yeast cells entrapped with alginate and hybrid beads. Iran Polym J. 2013. 23(2):111-119.
Lee et al., Size and Shape of Calcium Alginate Beads Produced by Extrusion Dripping. Chem Eng Technol, 2013. 36(10): 1627-1642.
Lopes et al., Preparation and characterization of alginate and gelatin microcapsules containing Lactobacillus rhamnosus. Anais da Academia Brasileira de Ciências, 2017. 89(3):1601-1613.
Madene et al., Flavour encapsulation and controlled release—a review. International Journal of Food Science and Technology, 2006. 41:1-21.
Manojlovic et al., Application of Electrostatic Extrusion—Flavour Encapsulation and Controlled Release. Sensors, 2008. 8:1488-1496.
Mao et al., The depolymerization of sodium alginate by oxidative Degradation. Pharmaceutical Development and Technology, 2012. 17(6):763-9.
Matyash et al., Swelling and mechanical properties of alginate hydrogels with respect to promotion of neural growth. Tissue Engineering Part C Methods, 2014. 20(5):401-411.
Milanovic et al., Microencapsulation of Flavors in Carnauba Wax. Sensors, 2010. 10:901-912.
Moghadam et al., Study of Parameters Affecting Size Distribution of Beads Produced from Electro-Spray of High Viscous Liquids. Iranian Journal of Chemical Engineering, 2009. 6(3):88-98.
Mohamed et al., Ability of Various Proteins to Form Thermostable Gels with Propylene Glycol Alginate. Food Chemistry, 1984. 13:241-255.
Murano. Use of natural polysaccharides in the microencapsulation techniques. J Appl Ichthyol, 14. 1998: 245-249.
Pathare et al. Formulation and Characterization of Micro particulate Carriers for Diclofenac Sodium. The Pharma Innovation Journal, 2013. 2(4): 92-96.
Peretz et al., Preparation of Porous Calcium Alginate Beads and Their use for Adsorption of O-Nitrophenol from Aqueous Solutions. 2014. pp. 123-136.
Petzold et al., Encapsulation of liquid smoke flavoring in ca-alginate and ca-alginate-chitosan beads. J Food Sci Technol, 2014. 51(1):183-190.

(56) References Cited

OTHER PUBLICATIONS

Prajapati et al., Polymers for Floating Drug Delivery System. Systematic Reviews in Pharmacy, 2011. 2(1): 1-7.

Rubiano et al., Encapsulation of d-limonene flavors using spray drying: effect of the addition of emulsifiers, Ingeniería y Competitividad, 2015. 17(2):77-89.

Said et al., Thermal decomposition of some divalent metal alginate gel compounds, Polymer Degradation and Stability, 1993. 39:393-397.

Salsac et al., Measurement of mechanical properties of alginate beads using ultrasound, CFM 2009-19ème Congrès Français de Mécanique. Marseille, 2009. 24-28 août.

Shaharuddin et al., Thermotolerance Study of Bagasse-Alginate Encapsulant using Effective Thermal Conductivity Model for Sustainable Probiotic Feed. Chemical Engineering Transactions, 2017. 56:1405-1410.

Shi et al., Drug Release of pH/Temperature-Responsive Calcium Alginate/Poly(N-isopropylacrylamide) Semi-IPN Beads. Macromol Biosci, 2006. 6:358-363.

Silva et al., Alginate microspheres prepared by internal gelation: Development and effect on insulin stability, Int J Pharm, 2006. 311(2006):1-10.

Soares et al., Thermal behavior of alginic acid and its sodium salt. Ecl. Quím., Sao Paulo, 2004. 29(2):53-56.

Soazo et al., Heat treatment of calcium alginate films obtained by ultrasonic atomizing: Physicochemical characterization. Food Hydrocolloids, 2015. 51:193-199.

Soliman. Microencapsulation of Essential Oils within Alginate: Formulation and inVitro Evaluation of Antifungal Activity, Journal of Encapsulation and Adsorption Sciences, 2013, 3:48-55.

Voo et al., Production of ultra-high concentration calcium alginate beads with prolonged dissolution profile. RSC Adv, 2015. 5(46):36687-36695.

Vreeker et al., Drying and Rehydration of Calcium Alginate Gels. Food Biophysics, 2008. 3:361-369.

Yadav et al., Formulation and Evaluation of Floating Beads of Norfloxacin, IOSR Journal of Pharmacy, 2016. 6(9):7-13.

Zheng et al., An improved pH-responsive carrier based on EDTA-Ca-alginate for oral delivery of Lactobacillus rhamnosus ATCC 53103. Carbohydrate Polymers, 2017. 155:329-335.

\* cited by examiner

PROCESS FOR PREPARING HIGH DENSITY, THERMOSTABLE POLYSACCHARIDE BEADS AS FOOD ADDITIVES

CROSS-REFERENCE TO RELATED APPLICATIONS

This application is filed under the provisions of 35 U.S.C. § 371 and claims the priority of International Patent Application No. PCT/EP2020/062573 filed on 6 May 2020 entitled "PROCESS FOR PREPARING HIGH DENSITY, THERMOSTABLE POLYSACCHARIDE BEADS AS FOOD ADDITIVES" in the name of Ola ARAFAT ARAFAT, et al., which claims priority to European Patent Application No. 19382345.7, filed on 7 May 2019, both of which are hereby incorporated by reference herein in their entirety.

TECHNICAL FIELD OF THE INVENTION

The invention relates to the field of very dense polysaccharide beads for encapsulating active ingredients. In particular the invention relates to high density and thermostable alginate beads that can be used in the food industry.

BACKGROUND OF THE INVENTION

Processes of encapsulation of active ingredients with different physicochemical properties, such as, hydrophilic, hydrophobic, volatile or non-volatile compounds in polysaccharides microparticles (beads) have been described for many applications including food, pharmaceutical, cosmetics and agriculture. The aim of encapsulation within polysaccharides matrix is to modify the release, enhance the stability against oxidation during storage and increase thermal resistance of thermo-labile or volatile compounds.

One of the most insoluble polysaccharide is sodium alginate. Cross-linked water insoluble alginate beads or microparticles have shown important benefits in applications related to cells, DNA, nutrients, microbes, slow release of flavors, vitamins, fragrances and drugs.

Among many manufacturing techniques, the conventional simple or emulsion dripping (extrusion) techniques have been considered as the most applicable method to obtain alginate particulate systems such as matrix solid microparticles (beads, or gel beads) or oil containing microcapsules or granules and breakable oil containing beads. This technique involves dissolving, dispersing or emulsifying the active compound of interest, dissolved in oil, in an aqueous alginate solution (concentration between 1 and 5% polysaccharide and preferably between 1-3% depending on the viscosity and type of alginate). This alginate solution may contain other types of polysaccharides. Then, cross-linked beads or microcapsules systems can be obtained by dripping solution or emulsion containing the active ingredient in the cross-linking solution.

In this regard, high concentrated alginate beads allows to obtain alginate system with different physicochemical properties and different gelation mechanisms, affecting release properties, thermal stability, strength, and rheology of the alginate gel particle systems.

All previous manufacturing processes, including conventional dripping one, are usually started by solubilization of alginate alone or mixed with other water-soluble polysaccharides or protein with total concentration of both from 1-5% (w/w). Generally, alginate solution or oil in water emulsion contain sodium alginate between 3-5% w/v.

However, the manufacturing of alginate beads with extremely high concentrated alginate solutions remains a challenge due to the difficulties in producing spherical and homogenous beads by the existing methods using very viscous solutions of alginate (more than 6% w/v). Therefore, there exists the need in the state of the art of new and reliable methodologies for the manufacture of high density alginate beads that yield homogeneous alginate particles having improved properties over conventional alginate beads.

SUMMARY OF THE INVENTION

In a first aspect, the invention relates to a process for preparing alginate gel beads comprising an active ingredient, wherein the process comprises:
 a. mixing a dry alginate salt with a liquid, wherein the liquid is selected from the group consisting of: (i) an aqueous solution, (ii) an oil in water emulsion and (iii) an aqueous suspension, at a ratio between the dry alginate salt and the liquid ranging between 1:5 and 1:0.4 w/w,
 b. adding an active ingredient to the mixture obtained in step (a) and
 c. adding a salt of a water soluble divalent or trivalent cation, thereby obtaining alginate gel beads or wherein the process alternatively comprises,
 a. mixing a dry alginate salt with a liquid, wherein the liquid is selected from the group consisting of: (i) an aqueous solution, (ii) an oil in water emulsion and (iii) an aqueous suspension, at a ratio between the dry alginate salt and the liquid ranging between 1:5 and 1:0.4 w/w, wherein the liquid further comprises an active ingredient, and
 b. adding a salt of a water soluble divalent or trivalent cation, thereby obtaining alginate gel beads.

In a second aspect, the invention relates to an alginate gel bead comprising an active ingredient obtainable by the process of the first aspect.

In another aspect, the invention relates to the use of the alginate gel bead of the second aspect as an additive for a food product or for releasing a flavor and/or fragrance at a temperature between 200-240° C. from a dry surface.

In another aspect, the invention relates to a dry surface comprising the alginate gel bead according to the second aspect, wherein the active ingredient is a flavor and/or fragrance.

DETAILED DESCRIPTION OF THE INVENTION

Figure 1:
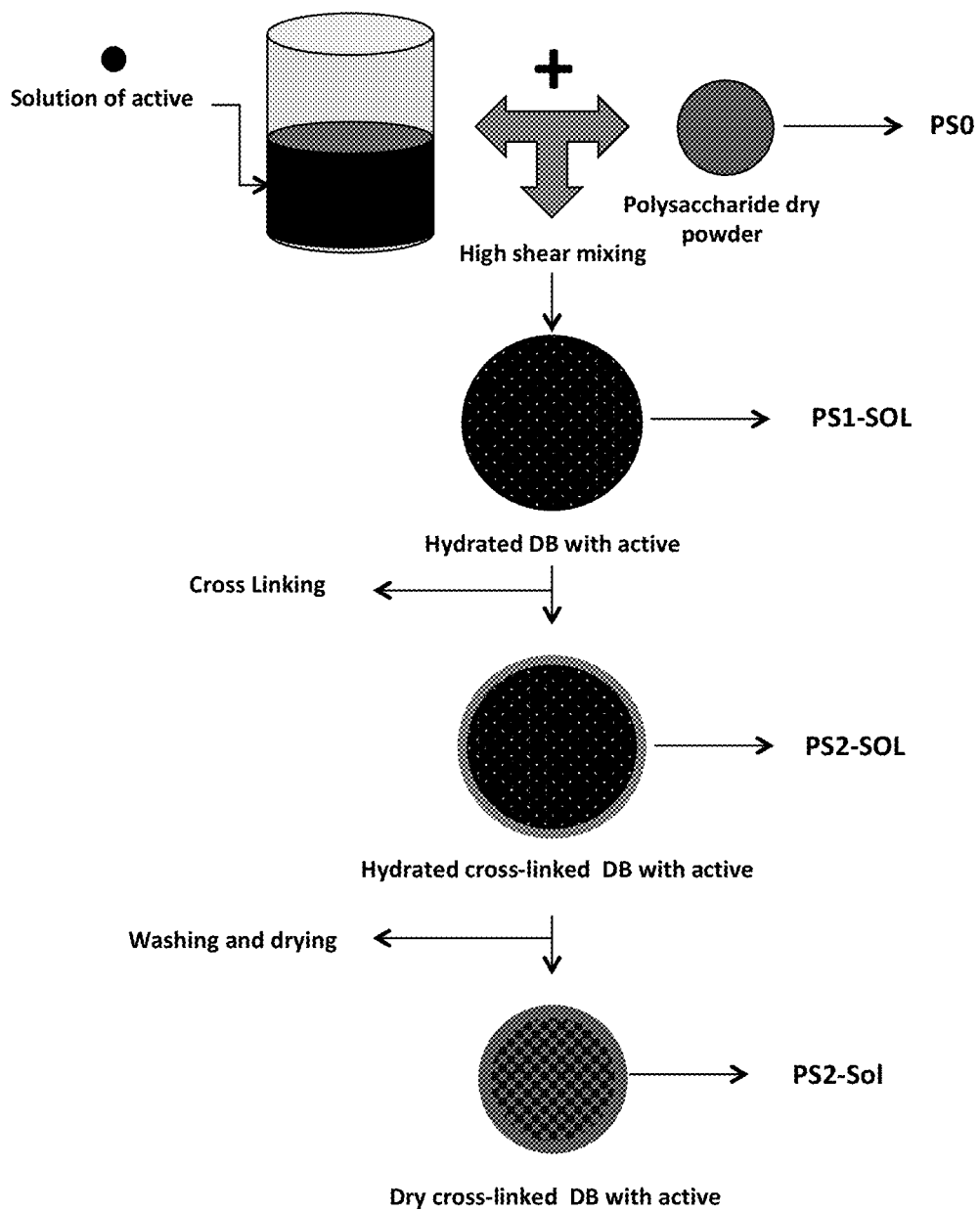
FIG. 1. Preparation of very high density bead (DB) with actives. Loading of active in DB during hydration process from solution.

The inventors of the present invention have developed a method for preparing very dense, thermostable, alginate gel beads that allow the controlled released of active ingredients. Said method involves mixing a dry alginate salt with a liquid containing water, resulting in the hydration instead of the solution of the alginate salt. The resulting alginate gel beads are capable of withstanding higher forces than conventional beads (Example 2, Table 6) and have a very dense matrix structure (Example 2, Table 5), low porosity allowing high thermal stability of active ingredients (Example 11) and high bioadhesive capacity to mucosal surfaces (Example 6).

Process for Preparing Alginate Gel Beads

Therefore, in a first aspect, the invention relates to a process for preparing alginate gel beads comprising an active ingredient, hereinafter process of the invention, wherein the process comprises:
  a. mixing a dry alginate salt with a liquid, wherein the liquid is selected from the group consisting of: (i) an aqueous solution, (ii) an oil in water emulsion and (iii) an aqueous suspension, at a ratio between the dry alginate salt and the liquid ranging between 1:5 and 1:0.4 w/w,
  b. adding an active ingredient to the mixture obtained in step (a) and
  c. adding a salt of a water soluble divalent or trivalent cation, thereby obtaining alginate gel beads,
or wherein the process alternatively comprises,
  a. mixing a dry alginate salt with a liquid, wherein the liquid is selected from the group consisting of: (i) an aqueous solution, (ii) an oil in water emulsion and (iii) an aqueous suspension, at a ratio between the dry alginate salt and the liquid ranging between 1:5 and 1:0.4 w/w, wherein the liquid further comprises an active ingredient, and
  b. adding a salt of a water soluble divalent or trivalent cation, thereby obtaining alginate gel beads.

The term "alginate", as used herein, refers to the anion of alginic acid. Therefore, according to the present invention, "alginate" and "alginate salt" are interchangeable. Alginate is a linear polymer formed by anions of β-D-mannuronic acid (M, β-D-mannuronate) and of α-L-guluronic acid (G, α-L-guluronate) bound by means of glycosidic bonds (1-4). Preferably, the β-D-mannuronate and α-L-guluronate units are in the form of blocks of G monomers (for example, -GGGGG-) and M monomers (for example, -MMMMM-), i.e., monomers of one and the same type are grouped together, said blocks being separated by a block of G and M monomers arranged in an alternating manner (for example, -GMGMGM-) and/or randomly (for example, -GGMGMMG-). Alginates form gels with divalent metal cations, such as calcium, following the model known as the egg-box. According to said model proposed by Grant in 1973, when two chains of G blocks are lined up side by side, it creates a gap which has the ideal dimension for the coordination of a divalent metal cation, particularly calcium. Preferably, the average molecular weight of the alginate is from 250 to 650 g/mol, preferably from 300 to 500 g/mol, more preferably from 350 to 450 g/mol, more preferably from 380 to 420 g/mol, even more preferably from 395 to 415 g/mol, most preferably from 400 to 410 g/mol.

Alginate can be harvest from most of the large brown seaweeds. The main commercial sources of alginate are species of *Ascophyllum, Durvillaea, Ecklonia, Laminaria, Lessonia, Macrocystis, Sargassum* and *Turbinaria*. Of these, the most important are *Laminaria, Macrocystis* and *Ascophyllum*.

Illustrative non-limitative examples of alginate salts are sodium alginate, potassium alginate, calcium alginate, ammonium alginate and triethanolamine salts of alginate. In a particular embodiment, the alginate salt is sodium alginate.

Alginate can have a viscosity, also referred as "alginate grade" in the present invention, ranging from 90 to 1000 mPa·s at concentration 1% w/v in water. In a particular embodiment, the alginate used for preparing the alginate gel beads of the invention has a viscosity less than 200 mPa·s, preferably between 90-100 mPa·s at concentration 1% w/v in water (LV, low viscosity alginate). In another particular embodiment, the alginate used for preparing the alginate gel beads of the invention has a viscosity between 201 and 700 mPa·s, preferably between 420 and 450 mPa·s at concentration 1% w/v in water (MV, medium viscosity alginate). In another particular embodiment, the alginate used for preparing the alginate gel beads of the invention has a viscosity higher than 701 mPa·s, preferably between 800-1000 mPa·s at concentration 1% w/v in water (HV, high viscosity alginate).

As used herein, the term "viscosity" relates to the resistance of a fluid to flow. Viscosity is a measure of the resistance of a fluid to gradual deformation by shear stress or tensile stress. In the context of the present invention, the viscosity of the alginate is the dynamic viscosity. The viscosity can be measured with a viscosimeter. Particularly, the values of viscosity of the present invention were measured for 1% w/v alginate in water, with a viscosimeter RVDV-I, at a temperature of 20° C., with a spindle 2 and at 20 rpm/min of rotational speed.

In a particular embodiment, different grades of the alginate salt, preferably sodium salt, are mixed with the liquid in step (a).

The term "alginate gel bead", as used herein, refers to a gel particle of alginate. The term "gel" refers to the cross-linking of alginate, that can be achieved by ionic crosslinking with cations (ionic gels) or acid precipitation (acidic gels). The alginate gel beads that can be obtained by the process of the invention are ionic gel beads.

Alginate particles can have a size ranging from less than 0.2 μm to more than 1 mm, including particles between 0.2 to 1000 μm. In a particular embodiment, the alginate gel beads obtained by the process of the invention have a diameter between 0.15 and 4 mm, for example, a diameter between 0.15 and 3.5 mm, between 0.3 and 3.5 mm, between 0.25 mm and 3 mm, between 0.25 and 2.5 mm, between 0.2 and 3 mm, between 0.2 and 4 mm. In a particular embodiment, the alginate gel beads obtained by the process of the invention have a diameter between 0.15 mm and 3.5 mm.

Preferably, the alginate gel beads obtained by the process of the invention have a diameter lower than 3.5 mm. Optimum size range will depend on the alginate viscosity. In a particular embodiment, optimum size range is between 0.2 and 4 mm for low viscosity alginate, between 0.2 and 3 mm for medium viscosity alginate, and between 0.15 mm and 3.5 mm for high viscosity alginate. Any suitable method can be used for determining the diameter of the beads, for example, sieving using different sizes of filter sheets and light microscopy, as in the examples. In a particular embodiment, the diameter of the alginate beads is D90, that is, the diameter at which 90% (weight percentage) of the alginate gel bead population is formed by alginate gel beads with a diameter smaller than the indicated value.

The first step of the process of the invention comprises mixing a dry alginate salt with a liquid selected from the group consisting of an aqueous solution, an oil in water emulsion and an aqueous suspension, at a ratio between the dry alginate salt and the liquid ranging between 1:5 and 1:0.4 w/w. As the skilled person will understand, as a result the alginate salt, preferably sodium alginate, is hydrated. The term "hydrated", as used herein, refers to a process by which dry alginate is wetted with water, resulting in alginate particles having a tacky surface. In the first step of the process of the invention, the alginate salt, preferably sodium alginate, is hydrated but not dissolved in the liquid.

The term "dry alginate salt" means that the alginate is not solved in any solvent, but in a dry or powder form. Dry alginate salt can have a content of water lower than 10%, preferably lower than 9%, preferably lower than 8%, preferably lower than 7%, preferably lower than 6%, even more preferably lower than 5%, preferably lower than 4%, preferably lower than 3%, more preferably lower than 2%, more preferably lower than 1%, even more preferably lower than 0.5%.

In a particular embodiment, the mixing of the dry alginate salt, preferably sodium alginate, with the liquid is performed by the slow addition of the dry alginate salt, preferably sodium alginate, into the liquid or, alternatively by the slow addition of the liquid into the dry alginate salt, in both cases under high shear mixing. The slow addition of the alginate salt is carried out at a flow rate between 1 and 50 mL/min, for example, between 2 and 45 mL/min, between 5 and 40 mL/min, between 10 and 30 mL/min, preferably at a flow rate of 20 mL/min. The high shear mixing is carried out at a speed between 800 and 3000 rpm, for example, at between 1000 and 2500 rpm, at between 1200 and 2200 rpm, preferably at between 1500 and 2000 rpm. Preferably, the mixing is carried out for 15 minutes. In a preferred embodiment, the mixing of the alginate salt with the liquid was carried out at a temperature between 18 and 30° C.

The term "liquid", also referred herein as "hydrating solution", refers to any liquid comprising water, preferably selected from the group consisting of:
(i) an aqueous solution,
(ii) an oil in water emulsion and
(iii) an aqueous suspension.

The term "aqueous solution" refers to any solution comprising water. In a particular embodiment, the aqueous solution is water, preferably distilled water. In another particular embodiment, the aqueous solution is a water solution including at least a water-miscible organic solvent.

In another particular embodiment, the liquid is an oil in water emulsion, particularly an oil in water emulsion wherein the external phase contains surfactants alone or in combination with water miscible solvents.

The term "emulsion", as used herein, refers to a mixture of two or more liquids that are normally immiscible. Emulsions are part of a more general class of two-phase systems of matter called colloids. The "oil in water emulsion", as used herein, refers to a mixture of oil and water wherein oil (the dispersed phase) is dispersed in water (the continuous phase). The term oil in water emulsion includes both macroemulsions, with an oil droplet size between 1 and 50 µm, and nanoemulsions, with an oil droplet size between 0.05 and 999.00 nm. In a particular embodiment, the oil in water emulsion is a nanoemulsion. In a more particular embodiment, the size of the oil droplet in the nanoemulsion is less than 10 µm, preferably between 0.1 and 5.0 µm, and more preferably less than 500 nm.

In a particular embodiment, the oil in water emulsion is an oil in water nanoemulsion with oil droplet size range between 0.05 and 999.99 nm, preferably between 0.1 and 5.0 µm, wherein the external phase contains surfactants alone or in combination with water miscible solvents.

The term "aqueous suspension", as used herein, refers to a heterogeneous mixture that contains water and solid particles sufficiently large for sedimentation. In a particular embodiment, the aqueous suspension is a water suspension comprising an active ingredient, in particular a microorganism or an insoluble particle of less than 10 µm.

In a particular embodiment, in the first step of the process of the invention, the dry alginate salt, preferably sodium alginate, and the liquid, preferably water, are mixed at a ratio between the dry alginate salt and the liquid ranging between 1:5 and 1:0.4 w/w, preferably between 1:4.5 and 1:0.5 w/w. In a particular embodiment, the ratio between the dry alginate salt, preferably sodium alginate, and the liquid, preferably water, is between 1:0.5 and 1:2.5. Said ranges give a size range of hydrated beads between 0.2 and 4.0 mm, more particularly between 0.3 and 3.5 mm. In another particular embodiment, the ratio between the dry alginate salt, preferably sodium alginate, and the liquid, preferably water, is between 1:0.75 and 1:4.0. Said range gives an size range of hydrated beads between 0.2 and 3.0 mm, more particularly between 0.25 and 3 mm. In another particular embodiment, the ratio between the dry alginate salt, preferably sodium alginate, and the liquid, preferably water, is between 1:1.25 and 1:4.5. Said range gives an size range of hydrated beads between 0.15 and 3.5 mm, more particularly between 0.25 and 2.5 mm.

In a particular embodiment, when the alginate salt, preferably sodium alginate, viscosity is less than 200 mPa·s, preferably between 90-1.00 mPa·s, the dry alginate salt, preferably sodium alginate, and the liquid, preferably water, are mixed at a ratio between the dry alginate salt and the liquid ranging between 1:0.5 and 1:2.5 w/w.

In another particular embodiment, when the alginate salt, preferably sodium alginate, viscosity is between 201 and 700 mPa·s, preferably between 420 and 450 mPa·s, the ratio between the dry alginate salt, preferably sodium alginate, and the liquid, preferably water, is between 1:0.75 and 1:4.0 w/w.

In another particular embodiment, when the alginate salt, preferably sodium alginate, viscosity is more than 701 mPa·s, preferably between 800 and 1000 mPas, the ratio between the dry alginate salt, preferably sodium alginate, and the liquid, preferably water, is between 1:1.25 and 1:4.5 w/w.

In a particular embodiment, when the alginate salt, preferably sodium alginate, viscosity is less than 200 mPa·s, preferably between 90-100 mPa·s, the dry alginate salt, preferably sodium alginate, and the liquid, preferably water, are mixed at a ratio between the dry alginate salt and the liquid ranging between 1:0.5 and 1:2.5 w/w, and the size range of hydrated beads is between 0.2 and 4.0 mm, more particularly between 0.3 and 3.5 mm.

In another particular embodiment, when the alginate salt, preferably sodium alginate, viscosity is between 201 and 700 mPa·s, preferably between 420 and 450 mPa·s, the ratio between the dry alginate salt, preferably sodium alginate, and the liquid, preferably water, is between 1:0.75 and 1:4.0, and the size range of the hydrated beads is between 0.2 and 3.0 mm, more particularly between 0.25 and 3 mm.

In another particular embodiment, when the alginate salt, preferably sodium alginate, viscosity is more than 701 mPa·s, preferably between 800 and 1000 mPas, the ratio between the dry alginate salt, preferably sodium alginate, and the liquid, preferably water, is between 1:1.25 and 1:4.5, and the size range of the hydrated beads is between 0.25 and 2.5, more particularly between 0.25 and 2.5 mm.

As a result, the concentration of alginate in the beads obtained by the process of the invention is between 15% and 70% (w/w). In a more particular embodiment, the concentration of alginate in the beads is between 18% and 70% (w/w), more particularly between 18.18% (w/w) and 66.66% (w/w), even more particularly between 28.57% and 66.66% (w/w), between 20% and 57.14% (w/w) or between 18.18% and 44.40% (w/w).

In a particular embodiment, the aqueous solution is water, preferably distilled water.

In a particular embodiment, all the ratios between the dry alginate salt and the liquid refer to sodium alginate and water.

In a particular embodiment, all the ratios between the dry alginate salt and the liquid refer to the dry alqinate salt and the water comprised in the liquid (dry alginate salt: water, w/w), irrespective of the liquid containing other components different from water.

In another particular embodiment, the liquid is a water solution comprising at least a water miscible organic solvent. A "water miscible" solvent or liquid, is a solvent or liquid that dissolves completely in water and is difficult to separate from water. In a more particular embodiment, the liquid is an aqueous solution of water miscible solvents, preferably propylene glycols (PG), glycerol, polyethylene glycol (PEG400) and/or absolute ethanol. The amount of hydration solution comprising water miscible solvents is preferably optimized for MV alginate grade considering that the ratio between dry alginate and distilled water is preferably 1:1.25 in order to achieve 44.44% (w/w) alginate within the hydrated beads. In said case, the acceptable amount of water miscible solvents is considered using MV alginate grade with acceptable size range of the hydrated alginate beads between 0.25 and 3 mm. In a particular embodiment, for propylene glycols (PG), the maximum acceptable amount of water miscible solvent is 36.61% (w/w) within hydrated beads containing 44.44% alginate. In a particular embodiment, for propylene glycols, the ratio between alginate, water and water miscible solvent is 1:1.25:1.3. In a particular embodiment, for glycerol, the maximum acceptable amount of water miscible solvent is 34.78% (w/w) within hydrated beads containing 44.44% alginate. In a particular embodiment, for glycerol, the ratio between alginate, water and water miscible solvent is 1:1.25:1.2. In a particular embodiment, for polyethylene glycol (PEG400), the maximum acceptable amount of water miscible solvent is 27.41% (w/w) within hydrated beads containing 44.44% alginate. In a particular embodiment, for polyethylene glycol, the ratio between alginate, water and water miscible solvent is 1:1.25:0.85. In a particular embodiment, for absolute ethanol, the maximum acceptable amount of water miscible solvent is 25.00% (w/w) within hydrated beads containing 44.44% alginate. In a particular embodiment, for absolute ethanol, the ratio between alginate, water and water miscible solvent is 1:1.25:0.75.

In another particular embodiment, the liquid is an oil in water emulsion, wherein the external phase contains surfactants alone or in combination with water miscible solvents. In a more particular embodiment, the liquid is an oil in water (O/W) emulsion comprising surfactant having HLB (Hydrophilic-Lipophilic Balance) more than 7, preferably Tween 80 (HLB 14.9), in concentration range between 0.1-10% w/v, and more preferably between 0.1-3% w/v. In the O/W emulsion of the invention, the size of oil droplet is less than 10 µm, preferably between 0.1 and 5 µm, and more preferably less than 500 nm.

In another particular embodiment, the liquid is oil in water (O/W) emulsion comprising surfactant with HLB more than 7, preferably Tween 80 (HLB 14.9) in concentration range between 0.1-10% w/v, and more preferably between 0.1-3% w/v. In said O/W, water miscible solvents, preferably propylene glycols (PG), glycerol, polyethylene glycol (PEG400) and/or absolute ethanol can be used as co-surfactants at concentration range less than 20% w/w, preferably between 1 and 10% w/w, and more preferably 5% w/w. In said o/w emulsion, the size of oil droplet is less than 10 µm, preferably between 0.1 and 5 µm, and more preferably less than 500 nm.

In a particular embodiment, the second step of the process of the invention comprises adding an active ingredient to the mixture obtained in step (a). Alternatively, the active ingredient can be comprised in the liquid that is mixed with the dry alginate salt, in which case this second step is omitted.

Therefore, the active ingredient can be added:

After mixing the dry alginate salt and the liquid, before mixing the dry alginate salt and the liquid. In this case, the active ingredient is mixed with the liquid and then the mixture of the active ingredient and the liquid is mixed with the dry alginate salt.

Simultaneously to the dry alginate salt and the liquid.

The term "active ingredient", as used herein, refers to any compound or particle whose incorporation into the alginate gel beads would be desirable, including hydrophilic or hydrophobic compounds, such as peptides and proteins, flavors and/or fragrances, microorganisms and insoluble particles.

In a particular embodiment, the active ingredient is selected from the group consisting of:
(i) a peptide or protein,
(ii) a flavor and/or fragrance,
(iii) a microorganism, and
(iv) an insoluble particle of less than 10 µm.

It will be understood that the terms "peptide bond", "peptide", "polypeptide" and protein are known to the person skilled in the art. From here on, "peptide" and "polypeptide" will be used indistinctly.

The term "flavor", as used herein, refers to a compound that imparts a desired flavor, including essential oils, flavor essences, isolated or pure chemical compounds, flavor modifiers, flavor enhancers, and the like. The term "fragrance", as used herein, refers to a compound having a pleasant aroma. In a particular embodiment, the flavors and fragrances are food grade flavors, which may be synthetic or artificial flavors, natural flavors or any mixture thereof. Illustrative non-limitative examples of flavors and fragrances are: complex mixtures like extracts, essential oils, crystalline compounds (thymol, menthol), oleoresins or reconstituted natural, nature-identical or synthetic flavors, natural extracts, essential oils and oleoresins, including fruit essences, vanilla extract, *capsicum* oleoresin, pepper oleoresin, cinnamon oil, oil of winter green, peppermint oil, bay oil, thyme oil, spearmint oil, *cassia* oil, citrus oils, and the like; reconstituted natural, nature-identical and artificial flavors including apple, cherry, strawberry, peach as well as meat, cheese, tomato and butter flavors. These compounds may be used individually or in a mixture as is well known in the art.

In a particular embodiment, the retention of the active ingredient, particularly a flavor or fragrance volatile compound, in the alginate beads after heating at 220-240° C. under dry or wet conditions is at least 60%. The term "dry conditions" refer to the alginate beads obtained by the method of the invention after the drying step. The term "wet conditions" refers to the alginate beads freshly prepared by the method of the invention, with no drying step. In a particular embodiment, the beads are heated a 220° C., 230° C. or 240° C. In a particular embodiment, the beads are heated at these temperatures for a period of time between 1 minute and 30 minutes, particularly 2 minutes, 3 minutes, 5 minutes, 10 minutes, 15 minutes, 20 minutes, 25 minutes, 30 minutes, preferably 3 minutes. In a particular embodiment, the dry or wet beads are heated at a temperature between 220-240° C. during 3 minutes.

In a particular embodiment, the retention after heating at 220° C. under dry conditions is at least 60%, at least 65%, at least 70%, at least 75%, at least 80%, at least 85%, at least 90%, at least 95% or higher, preferably at least 60%. In another particular embodiment, the retention after heating at 230° C. under dry conditions is at least 60%, at least 65%, at least 70%, at least 75%, at least 80%, at least 85%, at least 90%, at least 95% or higher, preferably at least 65%. In a particular embodiment, the retention after heating at 220° C. under wet conditions is at least 60%, at least 65%, at least 70%, at least 75%, at least 80%, at least 85%, at least 90%, at least 95% or higher, preferably at least 70%. In another particular embodiment, the retention after heating at 230° C. under wet conditions is at least 60%, at least 65%, at least 70%, at least 75%, at least 80%, at least 85%, at least 90%, at least 95% or higher, preferably at least 75%.

The retention of the active ingredient, particularly flavor and/or fragrance compound, in the beads after heating at 220-240° C. can be determined by collecting the beads after heating determining the active ingredient present in said beads, for example, by extracting the active ingredient and determining its quantity by any suitable method.

In a more particular embodiment, the flavor and/or fragrance is an essential oil or a crystalline compound. The term "essential oil", as used herein, refers to an oil which is a water-immiscible liquid produced by distillation from plant material that is used in perfumes, cosmetics, incenses, and in medicine. In a particular embodiment, the essential oil is D-limonene. The term "D-limonene", as used herein, refers to (4R)-1-methyl-4-(1-methylethenyl)-cyclohexene, which is also known by synonyms including (+)-4-isopropenyl-1-methylcyclohexene and (+)-p-mentha-1,8-diene, which is the main component in the oil of citrus fruit peels. In another particular embodiment, the essential oil is oregano oil. The term "oregano oil", as used herein, refers to an essential oil extracted from the leaves of the oregano plant (*Origanum vulgare*).

The term "crystalline compound", as used herein, refers to a volatile solid material whose components are arranged in a highly ordered microscopic structure. In a particular embodiment, the volatile crystalline compound is menthol or thymol. The term "menthol", as used herein, refers to 5-Methyl-2-(propan-2-yl)cyclohexan-1-ol, a crystalline compound, which can be obtained from the oils of corn mint, peppermint, or other mints, or can be made synthetically. The term "thymol", as used herein, refers to 2-isopropyl-5-methylphenol, a natural monoterpenoid that is found in nature in oil of thyme, extracted from *Thymus vulgaris*.

As the skilled person will understand, adding the active ingredient to the mixture of the alginate salt, preferably sodium alginate, and the liquid, or alternatively adding the active ingredient to the liquid previously or simultaneously with the dry alginate salt, results in the incorporation of the active ingredient to the alginate beads. Said incorporation is also referred herein as "encapsulation".

In a particular embodiment, the active ingredient is added by solution, oil/water emulsion or suspension.

In a particular embodiment, the incorporation of the active ingredient to the alginate beads is made by solution. The term "solution", as used herein, refers to the encapsulation of an active ingredient that is dissolved in the liquid used in the first step of the method of the invention. Encapsulation by solution may be used for hydrosoluble or liposoluble, volatile or non-volatile compounds, including small or large compounds as peptides and proteins. Depending on the type of active ingredient, the liquid will be chosen so that the active ingredient can be dissolved in said liquid.

Therefore, for hydrosoluble active ingredients, distilled water can be used as the liquid. The term "hydrosoluble", as used herein, refers to a chemical entity that is attracted to water molecules and tends to be dissolved by water. In this particular embodiment, the hydrosoluble active ingredient is dissolved in the aqueous solution at a concentration range from 0.01-70% w/w, preferably between 1-40% w/w and more preferably between 1-20% w/w. In said aqueous solution the active ingredient can be dissolved totally in distilled water at a temperature range between 4-50° C. Then, the aqueous solution with active ingredient is mixed with the dry alginate salt, preferably sodium alginate (FIG. 1, PS0) resulting in hydrated alginate beads loaded with the active ingredient (FIG. 1, PS1-SOL).

In a particular embodiment, the dry alginate beads obtained by the process of the invention, wherein the beads comprise a hydrosoluble active ingredient, allow very sustained-release, strong mucoadhesive properties and very high encapsulation efficiency (E.E) achieving the entrapment of about more than 90% of active within the alginate beads. The sustained release profile is related to the high density of the beads. Said sustained release is needed for food or oral administration of pharmaceutical active ingredients. In food products, many encapsulated hydrosoluble compounds have a problem of leakage from traditional beads and loss of active in the surrounding aqueous media.

Additionally, for liposoluble or sparingly water soluble active ingredients, a water solution including a water-miscible organic solvent can be used as liquid. The term "liposoluble" or "hydrophobe", as used herein, refers to a chemical entity that is not attracted by water molecules and cannot be dissolved in water. The term "sparingly water soluble", as used herein, refers to a chemical entity with a low solubility in water. A material is usually considered as sparingly water soluble if requires 30 to 100 mL of water to dissolve 1 g of the material. In this particular embodiment, the incorporation of the liposoluble active ingredient, or sparingly water soluble active ingredient, is carried out during the hydration process, more concretely, one or more active ingredient is dissolved in the aqueous solution at concentration range from 0.01-70% w/w, preferably between 1-40% w/w and more preferably between 1-20% w/w. The active ingredient can be dissolved first in a water miscible solvent, as co-solvent, and then mixed with distilled water at temperature range between 4-50° C. Water miscible solvents can be volatile or non-volatile ones as described in the present invention. Then, the aqueous solution with active ingredient is mixed with the dry alginate powder (FIG. 1, PS0) resulting in hydrated alginate beads loaded with active ingredient (FIG. 1. PS1-SOL).

In a particular embodiment, when the active ingredient is a volatile liposoluble or sparingly water soluble active ingredient, such as, for example food grade flavor or fragrances for cosmetic products, personal use, laundry detergents, fabric softeners, dryer sheets, room fresheners and carpet fresheners among other, a water miscible solvent can be used as a co-solvent to solubilize the flavor or fragrance. In this particular embodiment, an adequate amount of water miscible solvent is added to hydrated beads under shear mixing. In this case, water miscible solvent can be Labrasol, propylene glycol, ethanol among others, preferably absolute ethanol and propylene glycol. The flavor or fragrance previously dissolved in the water miscible solvent diffuses within the water phase of the hydrated beads, resulting in the in situencapsulation and inclusion.

Figure 2:
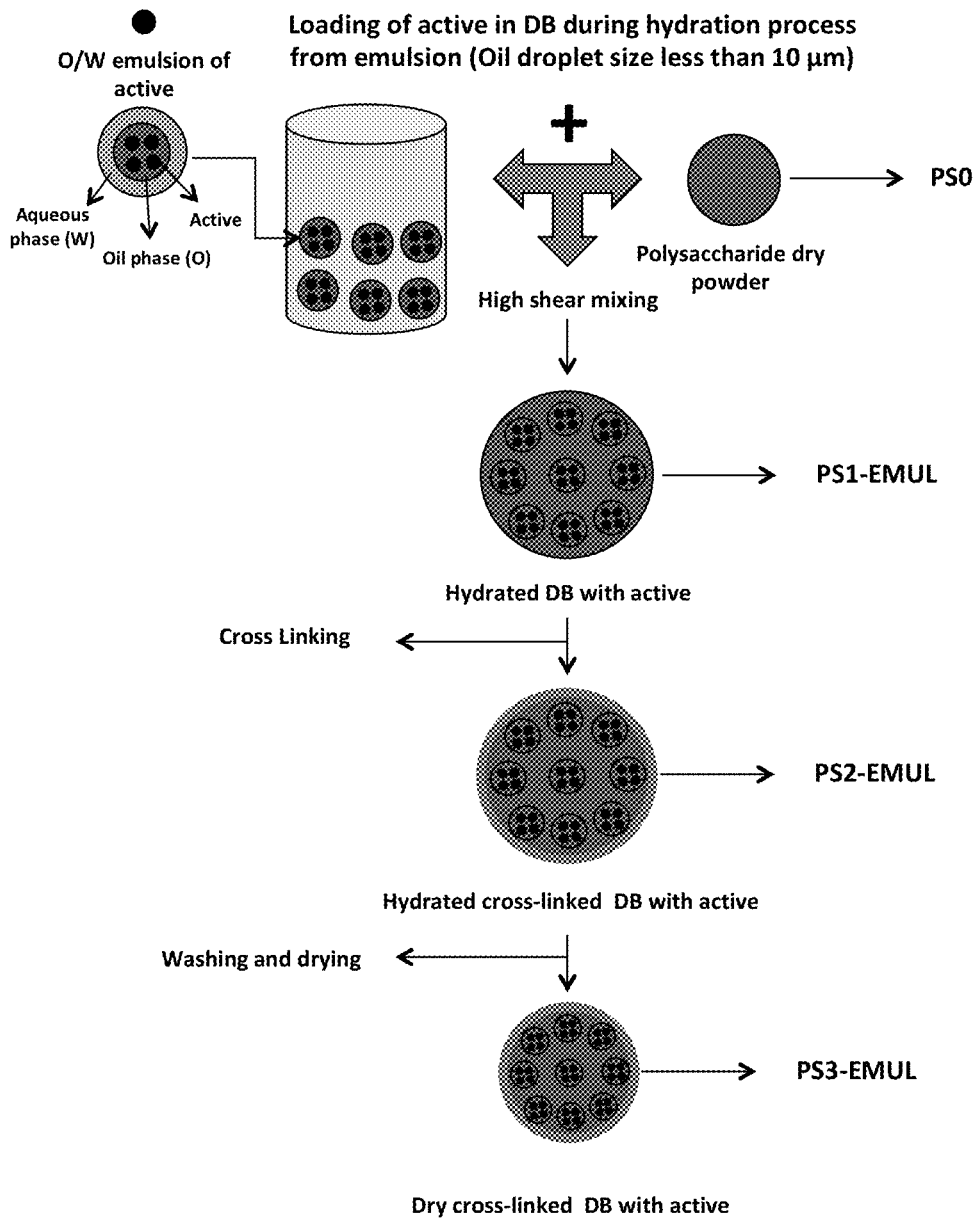
FIG. 2. Preparation of very high density bead (DB) with actives. Loading of active in DB during hydration process from emulsion (oil droplet size less than 10 μm).

Additionally, for liposoluble or sparingly water soluble active ingredients, an oil in water emulsion can be used as liquid. In this particular embodiment, the incorporation of the liposoluble active ingredient, or sparingly water soluble active ingredient, is performed during the hydration process, more concretely, one or more active ingredient, for example an essential oil, is emulsified in the liquid with a concentration range from 0.01-50% w/w, preferably between 1-40% w/w and more preferably between 1-20% w/w. In said liquid the active ingredient is emulsified directly in distilled water (o/w emulsion) containing surfactant. The surfactant as described in the invention is preferred to be with HLB more than 7, preferably tween 80 (HLB 14.9). The emulsification process using high shear mixing allows obtaining a stable nanoemulsion of oil droplets with a particle size of less than 10 μm, preferably less than 500 nm, and more preferably between 100-500 nm. In a particular embodiment, for crystalline volatile compounds, for example menthol, in order to obtain the nanoemulsion, it is necessary to heat above the melting point, between 40-50° C. Optionally, and according to the desired oil droplet size, water miscible solvents can be added to the water phase in o/w emulsion. Then, the aqueous emulsion with the active ingredient is mixed with the dry alginate salt (FIG. 2, PS0) resulting in hydrated alginate beads loaded with the active ingredient (FIG. 2. PS1-EMUL).

In a particular embodiment, when the active ingredient is a volatile liposoluble or sparingly water soluble active ingredient, such as, for example a flavor or fragrance, the liquid is an oil in water emulsion where the oily phase is a flavor or fragrance solution in non-volatile water immiscible liquids, including vegetable oils, medium chain triglycerides (MCT) or Triacetin, among others. In this particular embodiment; the oily phase contains flavor or fragrance at concentration range from 0.01-90% w/w, preferably between 10 and 30% w/w. The type of oil can be selected according to the expert criteria depending on the solubility of volatile liposoluble active ingredients.

In a particular embodiment, when the active ingredient is an essential oil, such as D-limonene, or a crystalline volatile active ingredient, such as thymol or menthol, the active ingredient is dissolved in oil. Then, oil containing active is emulsified with distilled water (0/W) at concentration range oil phase from 0.01-40% w/w, preferably between 1-30% w/w and more preferably between 1-20% w/w. The aqueous phase containing surfactant as described in the invention is preferred to be with HLB more than 7, preferably tween 80 (HLB 14.9) at concentration range from 0.1-5% w/w. The emulsification process using high shear mixing allows obtaining a stable emulsion of oil droplets with a particle size less than 10 μm, preferably less than 500 nm. Optionally, and depending on the desired oil droplet size, water miscible solvents can be added to the water phase in o/w emulsion.

The encapsulation of flavors using oils as flavor solvent is a very effective process where the use of food grade medium chain triglycerides (MCT), wheat germ oil, and triacetin has demonstrated high encapsulation efficiency between 75-90% for loading thymol.

Figure 3:
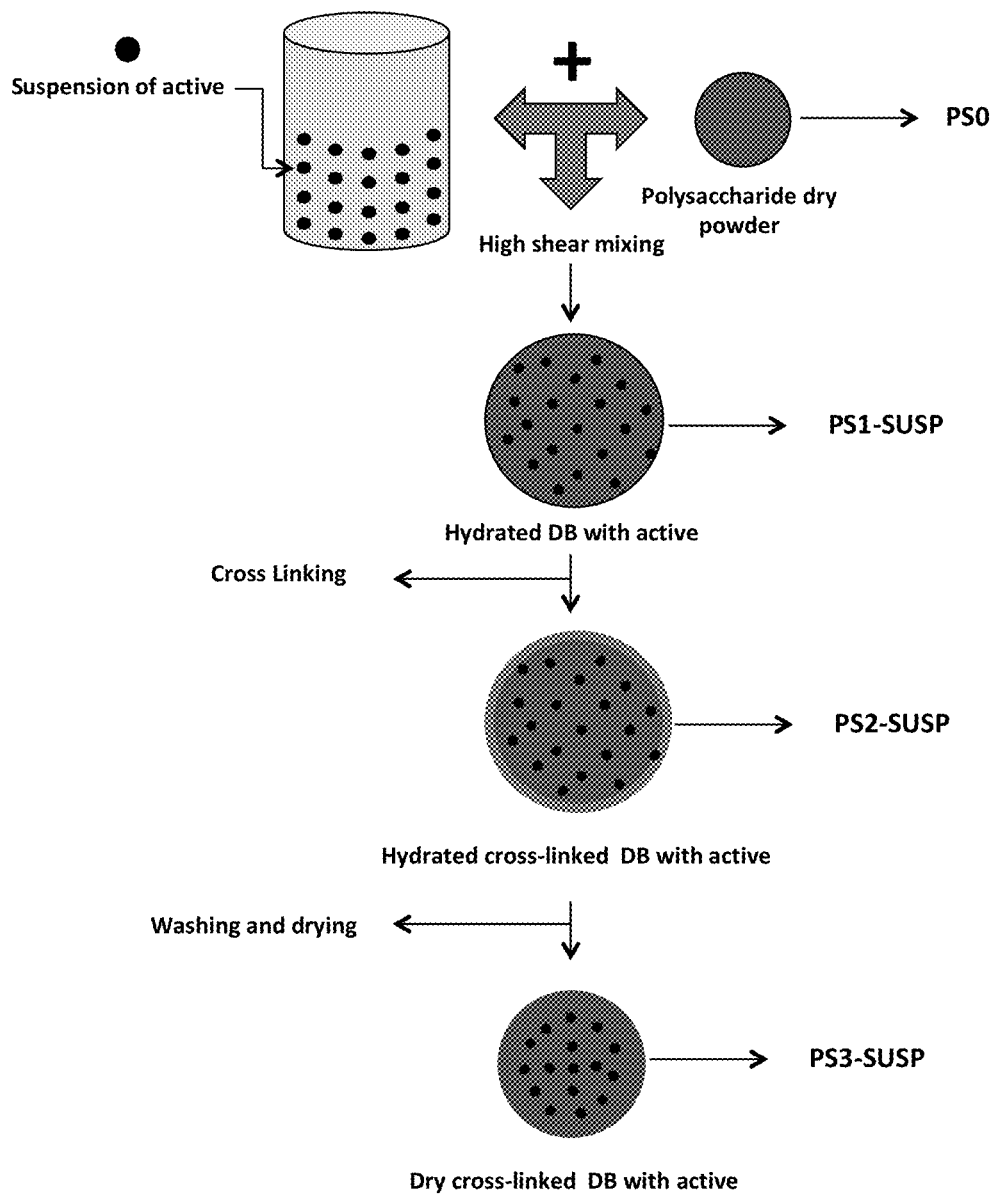
FIG. 3. Preparation of very high density bead (DB) with actives. Loading of active in DB during hydration process from suspension (particle size less than 10 μm).

In a particular embodiment, the incorporation of the active ingredient to the alginate beads is made by suspension. The term "suspension", as used herein, refers to the encapsulation of an active ingredient that is in suspension in the liquid used in the first step of the method of the invention. In this particular embodiment, the liposoluble or sparingly water soluble active ingredient is suspended in the liquid at concentration range from 0.01-40% w/w, preferably between 1-30% w/w and more preferably between 1-10% w/w. In said aqueous suspension of the active ingredient the diameter of the particles is less than 10 μm, preferably between 0.2-5 μm of individual resuspended particles. Then, the aqueous suspension with the active ingredient is mixed with the dry alginate salt (FIG. 3, PS0) resulting in hydrated alginate beads loaded with insoluble active ingredient (FIG. 3. PS1-SUSP).

In a particular embodiment, the active ingredient is an insoluble particle of less than 10 μm. The insoluble particle of less than 10 μm can be any particle that can be in suspension in the aqueous suspension used for the hydration of the alginate salt, particularly sodium alginate, and can be encapsulated in the alginate beads by the suspension method described above. In a particular embodiment, the insoluble particle is a zeolite particle. The term "zeolite", as used herein, refers to microporous, aluminosilicate minerals commonly used in the industry as adsorbents and catalysts.

In a particular embodiment, the particle is a microorganism. The term "microorganism", as used herein, refers to a microscopic organism, which may be a single cell or multicellular organism, and may also be prokaryotic or eukaryotic organisms. In a particular embodiment, the microorganism is a bacteria, more particularly, a bacterium of the genus "*Rhizobium*". The term "*Rhizobium*", as used herein, refers to a genus of Gram-soil bacteria that fix nitrogen. Illustrative non-limitative examples of species of *Rhizobium* that can be used as active ingredients include: *Rhizobium aegyptiacum, Rhizobium aggregatum, Rhizobium alamii, Rhizobium altiplani, Rhizobium alvei, Rhizobium anhuiense, Rhizobium azibense, Rhizobium azooxidifex, Rhizobium bangladeshense, Rhizobium binae, Rhizobium calliandrae, Rhizobium capsici, Rhizobium cauense, Rhizobium cellulosilyticum, Rhizobium daejeonense, Rhizobium ecuadorense, Rhizobium endolithicum, Rhizobium endophyticum, Rhizobium etli, Rhizobium fabae, Rhizobium flavum, Rhizobium freirei, Rhizobium gallicum, Rhizobium grahamii, Rhizobium hainanense, Rhizobium halophytocola, Rhizobium halotolerans, Rhizobium indigoferae, Rhizobium jaguaris, Rhizobium kunmingense, Rhizobium laguerreae, Rhizobium leguminosarum, Rhizobium lemnae, Rhizobium lentis, Rhizobium leucaenae, Rhizobium loessense, Rhizobium lusitanum,* "*Candidatus Rhizobium massiliae*", *Rhizobium mayense,*

*Rhizobium mesoamericanum, Rhizobium mesosinicum, Rhizobium metallidurans, Rhizobium miluonense, Rhizobium mongolense, Rhizobium multihospitium, Rhizobium naphthalenivorans, Rhizobium oryzicola, Rhizobium pakistanensis, Rhizobium paranaense, Rhizobium petrolearium, Rhizobium phaseoli, Rhizobium phenanthrenilyticum, Rhizobium pisi, Rhizobium pongamiae, Rhizobium populi, Rhizobium qilianshanense, Rhizobium rhizogenes, Rhizobium rhizoryzae, Rhizobium rosettiformans, Rhizobium selenitireducens, Rhizobium smilacinae, Rhizobium soli, Rhizobium sophorae, Rhizobium sophoriradicis, Rhizobium straminoryzae, Rhizobium subbaraonis, Rhizobium sullae, Rhizobium tarimense, Rhizobium tibeticum, Rhizobium tropici, Rhizobium tubonense, Rhizobium vallis, Rhizobium yanglingense, Rhizobium yantingense.*

In a particular embodiment, the microorganism is a mixture of strains of bacteria of the genus *Rhizobium*.

In a particular embodiment, the active ingredient comprises a microorganism, preferably a bacterium of the genus *Rhizobium* and a particle of less than 10 µm, preferably zeolite.

When the active ingredient is a microorganism, preferably *Rhizobium*, or a combination of a microorganism and a particle of less than 10 µm, preferably a combination of *Rhizobium* and zeolite, the active ingredient is dissolved in water.

The third step of the process of the invention comprises adding a salt of a water soluble divalent or trivalent cation, thereby obtaining alginate gel beads. As the skilled person knows, alginate is able to gel by ionic crosslinking. Therefore, as a result of step c of the process of the invention, the alginate salt is crosslinking by the divalent or trivalent cations, resulting in the formation of alginate gel particles.

The term "cross-linking," as used herein, refers to the reaction of gelification of the alginate salt. As the skilled person will know, an alginate gel can be obtained from alginate by ionic crosslinking with trivalent or divalent cations. In a particular embodiment, divalent cations are used, such as Mn, Zn, Ni, Co, Fe, Ca, Sr, Ba, Cd, Cu and Pb. In a more particular embodiment, a salt of calcium is used. In an even more particular embodiment, the salt of calcium is calcium chloride. However, alginate gelification is also possible using trivalent cations, such as Al and Fe.

The water soluble salt of the divalent or trivalent cation can be added in solution, but is preferably added as a dry powder.

In a particular embodiment, the salt of the divalent cation, preferably calcium, more preferably calcium chloride, is added to the mixture of alginate, liquid and active ingredient at a concentration between 1% and 20% (calcium weight/alginate weight). In a more particular embodiment, the salt of the divalent cation, preferably calcium, preferably calcium chloride, is added to the mixture of alginate, liquid and active ingredient at a concentration between 5% and 15% (calcium weight/alginate weight). In an even more particular embodiment, the salt of the divalent cation, preferably calcium, preferably calcium chloride, is added to the mixture of alginate, liquid and active ingredient at a concentration of 12.5% (calcium weight/alginate weight).

In a particular embodiment, the water soluble salt of a divalent or trivalent cation is added to the liquid under shear mixing at 1500-2000 rpm.

When the water soluble salt of the divalent or trivalent cation, preferably calcium chloride, contacts the alginate beads, said salt starts to dissolve in the matrix of the hydrated beads, and then the cations diffuse slowly into hydrated alginate beads. The contact time is preferably as minimum 15 min contact before washing with distilled water, and more preferably 2 hours contact with hydrated beads before washing with distilled water.

In another particular embodiment, the third step of the process of the invention is performed under shear mixing at 1500-2000 rpm, at temperature range from 4-50° C., preferably between 15° C.-30° C.

In a particular embodiment, after adding the salt of a divalent or trivalent cation, the resulting alginate gel beads are incubated with no agitation at a temperature between 23 and 28° C. for a period of time between 30 min and 4 hours. In a more particular embodiment, the temperature is between 24 and 26° C., more particularly 25° C. In a particular embodiment, the period of time is between 1 and 3 hours, more particularly 2 hours. In a particular embodiment, after adding the salt of a divalent or trivalent cation, the resulting alginate gel beads are incubated with no agitation at a temperature of 25° C. for 2 hours.

In another particular embodiment, the alginate gel beads obtained by the process of the invention are washed with distilled water. The purpose of this wash is to eliminate any excess of calcium chloride.

In another embodiment, cross-linked DB can be used without washing or drying as wet (humid) water insoluble DB.

In a particular embodiment, the hydrated alginate gel beads obtained by the process of the invention have a hardness of more than 1 kg/cm$^2$/g beads, for example, 1.10 kg/cm$^2$/g beads, 1.20 kg/cm$^2$/g beads, 1.25 kg/cm$^2$/g beads, 1.30 kg/cm$^2$/g beads, 1.40 kg/cm$^2$/g beads, 1.50 kg/cm$^2$/g beads, 1.60 kg/cm$^2$/g beads or more. Preferably, bead hardness is between 1.20 and 1.30 kg/cm$^2$/g beads. Bead hardness can be determined by methods know by the skilled person, for example, the shear force test described in the Examples 1 and 2.

In a particular embodiment, the process of the invention further comprises isolating the obtained alginate beads. In a particular embodiment, isolation is performed by filtration. In a particular embodiment, the alginate beads are isolated by filtration using a filter with a pore size of 1 µm.

In a particular embodiment, the process of the invention further comprises drying the alginate gel beads. The term "drying", as used herein, refers to removing the liquid used in the first step. However, as the skilled person will understand, a certain humidity in the alginate beads is acceptable after drying. In a particular embodiment, the humidity in the alginate beads after drying the beads is less than 15%, more preferably between 2.5 and 7%, even more preferably between 3-6%, even more preferably between 3-5%, more preferably between 3.5-4.5%, more preferably between 3.5-4.3%. The humidity in the alginate beads can be determined by any suitable method, for example, by gravimetric analysis as described in the Examples.

Drying the alginate gel beads can be performed by any suitable method, for example, by fluid bed drying. In a particular embodiment, the alginate gel particles are dried by fluid bed dryer at a temperature of 40° C., air flow 50 L/min during 1 hour.

In a particular embodiment, the alginate gel particles obtained after the third step of the process of the invention are first isolated, preferably by filtration, and then dried, preferably by fluid bed drying, more preferably by fluid bed dryer at a temperature of 40° C., air flow 50 L/min during 1 hour.

In a particular embodiment, the dry alginate gel beads have a diameter between 0.1 mm and 2 mm. In a preferred embodiment, at least 80% of the population of dry alginate gel beads have a diameter between 0.25 and 1 mm for all alginate grades. In a more preferred embodiment, at least 90% of the population of dry alginate gel beads have a diameter between 0.25 and 1 mm for all alginate grades. Preferably, said diameters have been measured by sieving.

In another particular embodiment, the dry alginate gel beads made from an aqueous solution containing a water miscible solvent have a diameter between 0.1 mm and 2 mm. In a preferred embodiment, at least 85% of the population of dry alginate gel beads have a diameter between 0.25 mm and 1 mm for all alginate grades.

In another particular embodiment, the dry alginate gel beads made from mixture with polysaccharides that cannot be crosslinked with calcium have a diameter between 0.1 mm and 2 mm. In a preferred embodiment, at least 90% of the population of dry alginate gel beads have a diameter between 0.25 mm and 1 mm for all alginate grades.

In a particular embodiment, the dry alginate gel beads are substantially spherical in shape, with very high dense matrix comprising a high concentration of dry polysaccharides within individual beads.

In a particular embodiment, the dry alginate gel beads have a bulk density of more than 0.6 g/mL, preferably more than 0.7 g/mL, even more preferably between 0.650 g/mL and 1 g/mL. In a more particular embodiment, for dry alginate gel beads with a diameter between 0.4 and 0.5 mm made from 30% of medium viscosity sodium alginate, the bulk density is more than 0.6 g/mL, preferably more than 0.7 g/mL, more preferably between 0.650 g/mL and 1 g/mL.

In a particular embodiment, the dry alginate gel beads have a tapped density of more than 0.650 g/mL, more preferably between 0.7 g/mL and 1.2 g/mL. In a more particular embodiment, for dry alginate gel beads with a diameter between 0.4 and 0.5 mm made from 30% medium viscosity sodium alginate, the tapped density is more than 0.650 g/mL, more preferably between 0.7 g/mL and 1.2 g/mL.

The term "bulk density", as used herein, refers to the ratio between the mass of the particles and the total volume. The total volume includes particle volume, inter-particle void volume, and internal pore volume. The term "tapped density", as used herein, refers to the ratio of the mass of the particles and the volume occupied by the particles after they have been tapped for a defined period of time.

Bulk and tapped density can be calculated by any suitable method, for example, using the measuring cylinder method as explained in Example 2 and disclosed in Yadav V. D. et al., Formulation and Evaluation of Floating Beads of Norfloxacin. IOSR Journal of Pharmacy, 2016, 6 (9): 7-13. In a preferred embodiment, the bead volume was calculated considering the particles to be spherical shape by determining the diameter before and after drying by visual image analysis and high accuracy digital micrometer; and the bead mass was obtained by weighting the beads with a precision scale balance.

In another particular embodiment, dry alginate gel beads are mucoadhesive, that is, they can adhere to mucosal surfaces, such as buccal mucosa, and thus allowing more residence time of the alginate particles at any mucosal surfaces.

In a particular embodiment, the bulk density of the dry alginate beads is more than 0.7 g/mL In a particular embodiment, the process of the invention further comprises mixing the dry alginate salt, preferably sodium alginate, with at least one dry additional polysaccharide different from alginate before mixing the dry alginate salt and the liquid wherein the ratio of said additional polysaccharide and the alginate salt, preferably sodium alginate, in the liquid is between 10:90 and 70:30 w/w.

In a particular embodiment, when the alginate gel beads comprise an additional polysaccharide different from alginate, the humidity in the beads after drying the beads is comprised between 2.5 and 7%, even more preferably between 3-6%, even more preferably between 3-5%, more preferably between 3.5-4.5%, more preferably between 3.5-4.3%.

The additional polysaccharide is preferably a polysaccharide that cannot be crosslinked by a cation. The term "polysaccharide that cannot be cross-linked by a cation" or "non-crosslinkable polysaccharide", as used herein, refers to a polysaccharide that cannot bind a cation to form a gel, as opposed to the alginate salt. As the skilled person knows, these non-crosslinkable polysaccharides, are non-acidic or do not contain sufficient amount of mannuronic and glucuronic acid residues to be cross-linked with divalent or trivalent cations.

Illustrative non-limitative examples of these polysaccharides that can be mixed with the alginate salt, preferably sodium alginate, in the process of the invention include negatively-charged, water soluble polysaccharides, such as xanthan gum and carrageenan, neutral water-soluble polysaccharides, such as guar gum, and neutral water insoluble polysaccharides, such as modified starch from corn.

In a particular embodiment, the additional polysaccharide is xantham gum. The term "xantham gum", as used herein, refers to a polysaccharide with CAS Number 11138-66-2, which is usually used as thickening agent and stabilizer in food.

In another particular embodiment, the additional polysaccharide is carrageenan. The term "carrageenan", as used herein, refers to a family of sulfated polysaccharides that are extracted from red edible seaweeds, and widely used in the food industry for gelling, thickening and stabilizing. All carrageenans are high-molecular-weight polysaccharides made up of repeating galactose units and 3,6 anhydrogalactose (3,6-AG), both sulfated and nonsulfated. The units are joined by alternating $\alpha$-1,3 and $\beta$-1,4 glycosidic linkages. The carrageenans useful for the process of the invention are Lambda, which do not form gels, and Kappa, that forms strong, rigid gels in the presence of potassium ions, and reacts with dairy proteins.

In another particular embodiment, the additional polysaccharide is guar gum. The term "guar gum", as used herein, refers to a galactomannan polysaccharide (CAS Number 9000-30-0) extracted from guar beans usually used in food industry as a thickener and stabilizer.

In another particular embodiment, the additional polysaccharide is modified starch, particularly modified starch from corn or modified cornstarch. The term "modified starch from corn", as used herein, refers to starch derivatives prepared by physically, enzymatically or chemically treating native starch from corn. They are usually used in food industry as thickeners, stabilizers or emulsifiers. Illustrative non-limitative examples of modified starch include the following:

acid-treated starch (INS 1401), also called thin boiling starch, is prepared by treating starch or starch granules with inorganic acids, e.g. hydrochloric acid breaking down the starch molecule and thus reducing the viscosity.

dextrin (INS 1400), roasted starch with hydrochloric acid, alkaline-modified starch (INS 1402) with sodium hydroxide or potassium hydroxide, bleached starch (INS 1403) with hydrogen peroxide, oxidized starch (INS 1404, E1404) with sodium hypochlorite, breaking down viscosity,
enzyme-treated starch (INS 1405), maltodextrin, cyclodextrin,
monostarch phosphate (INS 1410, E1410) with phosphorous acid or the salts sodium phosphate, potassium phosphate, or sodium triphosphate to reduce retrogradation,
distarch phosphate (INS 1412, E1412) by esterification with, for example, sodium trimetaphosphate,
crosslinked starch modifying the rheology, the texture,
acetylated starch (INS 1420, E1420) esterification with acetic anhydride,
hydroxypropylated starch (INS 1440, E1440), starch ether, with propylene oxide, increasing viscosity stability,
hydroxyethyl starch, with ethylene oxide,
starch sodium octenyl succinate (OSA) starch (INS 1450, E1450) used as emulsifier adding hydrophobicity,
starch aluminium octenyl succinate (INS 1452, E1452),
cationic starch, adding positive electrical charge to starch,
carboxymethylated starch with monochloroacetic acid adding negative charge,
phosphated distarch phosphate (INS 1413, E1413),
acetylated distarch phosphate (INS 1414, E1414),
acetylated distarch adipate (INS 1422, E1422),
hydroxypropyl distarch phosphate (INS 1442, E1442),
acetylated oxidized starch (INS 1451, E1451).

In a particular embodiment, the concentration of the additional polysaccharide in the liquid is at least 5% w/w. In a more particular embodiment, the concentration of the additional polysaccharide in the liquid is between 5-35% w/w.

In a particular embodiment, the ratio between the additional polysaccharide, in particular a negatively charged water-soluble polysaccharide, preferably xanthan gum, and the alginate salt, preferably sodium alginate, is between 10:90 and 70:30 (w/w), for example, 30:70 (w/w) and 50:50 (w/w).

In another particular embodiment, the ratio between the additional polysaccharide, in particular. A negatively charged water-soluble polysaccharide, preferably carrageenan, and the alginate salt, preferably sodium alginate, is between 10:90 and 70:30 (w/w), for example, 30:70 (w/w) and 50:50 (w/w).

In another particular embodiment, the ratio between the additional polysaccharide, in particular a neutral water-soluble polysaccharide, preferably guar gum, and the alginate salt, preferably sodium alginate, is between 10:90 and 70:30 (w/w), for example, 30:70 (w/w) and 50:50 (w/w).

In another particular embodiment, the ratio between the alginate salt, preferably sodium alginate, and the additional polysaccharide, in particular a neutral insoluble modified starch from corn, is between 10:90 and 70:30 (w/w), for example, 30:70 (w/w) and 50:50 (w/w).

In a particular embodiment, the ratio between dry total polysaccharides (including the alginate salt and additional polysaccharides) and the liquid, preferably water, is 1:1 w/w.

Alginate Gel Bead

In another aspect, the invention refers to an alginate gel bead, hereinafter alginate gel bead of the invention, obtained by the process of the invention.

In a particular embodiment, the alginate gel bead obtained by the process of the invention is an alginate gel bead comprising an active ingredient, wherein the concentration of alginate in the alginate gel bead is between 15% and 70% (w/w).

The terms "alginate", "alginate gel bead", and "active ingredient" have been previously defined in connection with the process of the invention. All the particular and preferred embodiments of the process of the invention regarding these terms fully apply to the alginate gel bead of the invention.

In a particular embodiment, the alginate gel bead has a diameter between 0.15 and 4 mm, for example, a diameter between 0.15 and 3.5 mm, between 0.3 and 3.5 mm, between 0.25 mm and 3 mm, between 0.25 and 2.5 mm, between 0.2 and 3 mm, between 0.2 and 4. In a particular embodiment, the alginate gel bead has a diameter between 0.15 and 3.5 mm. Optimum size range will depend on the alginate viscosity. In a particular embodiment, optimum size range is between 0.2 and 4 mm for low viscosity alginate, between 0.2 and 3 mm for medium viscosity alginate, and between 0.15 mm and 3.5 mm for high viscosity alginate. Any suitable method can be used for determining the diameter of the beads, for example, sieving using different sizes of filter sheets and light microscopy, as in the examples.

In a particular embodiment, the alginate gel bead of the invention has a hardness of more than 1 kg/cm$^2$/g beads, for example, 1.1 kg/cm$^2$/g beads, 1.2 kg/cma/g beads, 1.3 kg/cm$^2$/g beads, 1.4 kg/cm$^2$/g beads, 1.5 kg/cm$^2$/g beads, 1.6 kg/cm$^2$/g beads or more. Bead hardness can be determined by methods know by the skilled person, for example, the shear force test described in the Example 2. In a particular embodiment, the alginate gel bead has a hardness of more than 1 kg/cm$^2$/g beads.

In a particular embodiment, the concentration of alginate in the bead is between 18 and 70% (w/w), more particularly between 18.18% (w/w) and 66.66% (w/w), even more particularly between 28.57% and 66.66% (w/w), between 20% and 57.14% (w/w) or between 18.18% and 44.40% (w/w).

In a particular embodiment, for LV alginate grade, the concentration of alginate in the bead is between 25% and 70%, preferably between 28% and 67%, even more preferably between 28.57% and 66.66% (w/w). Said range give asize range of hydrated beads between 0.2 and 4 mm, more particularly between 0.3 and 3.5 mm.

In another particular embodiment, for MV alginate grade, the concentration of alginate in the bead is between 15 and 60%, more preferably between 18% and 58%, even more preferably between 20% and 57.14% (w/w). Said range give asize range of hydrated beads between 0.2 and 3.0 mm, more particularly between 0.25 and 3 mm.

In another particular embodiment, for HV alginate grade, the concentration of alginate in the bead is between 15% and 50%, more preferably between 18% and 45%, even more preferably between 18.18% and 44.40% (w/w) as dry weight of alginate within the hydrated bead. Said range give asize range of hydrated beads between 0.15 and 3.5, more particularly between 0.25 and 2.5 mm.

The alginate gel bead of the invention comprises a cationic alginate gel, that is, an alginate gel obtained by crosslinking an alginate salt, preferably sodium alginate, with a divalent or trivalent cation, as explained before in connection with the process of the invention. In a particular embodiment, the alginate gel bead comprises a divalent or a trivalent cation gel. In a particular embodiment, the divalent cations gel is a Mn, Zn, Ni, Co, Fe, Ca, Sr, Ba, Cd, Cu or Pb gel. In a more particular embodiment, the alginate gel is a calcium gel. In another particular embodiment, the alginate gel is a trivalent cation gel. In a more particular embodiment, the gel is an Al or Fe alginate gel.

In a particular embodiment, the alginate gel bead further comprises an additional polysaccharide at a ratio between the additional polysaccharide and the alginate in the bead between 10:90 and 70:30 w/w.

In a particular embodiment, the additional polysaccharide is a negatively-charged, water soluble polysaccharide, such as xanthan gum and carrageenan, neutral water-soluble polysaccharides, such as guar gum, and neutral water insoluble polysaccharides, such as modified starch from corn.

In a particular embodiment, the ratio between the additional polysaccharide, in particular a negatively charged water-soluble polysaccharide, preferably xanthan gum, and the alginate salt, preferably sodium alginate, is between 10:90 and 70:30 (w/w), for example, 30:70 (w/w) and 50:50 (w/w).

In another particular embodiment, the ratio between the additional polysaccharide, in particular a negatively charged water-soluble polysaccharide, preferably carrageenan, and the alginate salt, preferably sodium alginate, is between 10:90 and 70:30 (w/w), for example, 30:70 (w/w) and 50:50 (w/w).

In another particular embodiment, the ratio between the additional polysaccharide, in particular a neutral water-soluble polysaccharide, preferably guar gum, and the alginate salt, preferably sodium alginate, is between 10:90 and 70:30 (w/w), for example, 30:70 (w/w) and 50:50 (w/w).

In another particular embodiment, the ratio between the alginate salt, preferably sodium alginate, and the additional polysaccharide, in particular a neutral insoluble modified starch from corn, is between 10:90 and 70:30 (w/w), for example, 30:70 (w/w) and 50:50 (w/w).

In a particular embodiment, the active ingredient is selected from the group consisting of:
(i) a peptide or protein,
(ii) a flavor and/or fragrance,
(iii) a microorganism, and
(iv) an insoluble particle of less than 10 μm.

In a particular embodiment, the active ingredient is a flavor and/or fragrance. In a particular embodiment, the flavor and/or fragrance is an essential oil and/or a crystalline compound. In a more particular embodiment, the essential oil is D-limonene or oregano oil, and the crystalline compound is menthol or thymol.

In another particular embodiment, the active ingredient is a microorganism, more particularly a bacterium of the genus *Rhizobium*. In a particular embodiment, the active ingredient is a microorganism, more particularly a bacterium of the genus *Rhizobium*, and an insoluble particle of less than 10 μm, more particularly zeolite.

Food Product and Uses of the Alqinate Gel Bead as Food Additive

In another aspect, the invention relates to a food product comprising the alginate gel bead of the invention.

The term "food product", as used herein, refers to any substance, consumed to provide nutritional support for a living organism, human and/or animal. The food product may be consumed by humans, pets, such as cats and dogs, for example, and/or other animals. It may be a bakery product, that is, a product that is prepared by baking, or a dough for a bakery product, for a biscuit, a cookie, a brownie, a cake, a cupcake, a pizza, bread, or a dough for preparing the same, it may also be a microwavable meal, that is, a product that is prepared to be consumed just after heating it, preferably by microwave heating. It may also be a liquid product, such as for example, a soup. In a particular embodiment, the food product is a bakery product. In a more particular embodiment, the food product is a pancake, pancake dough, pizza or pizza dough.

The alginate beads of the invention can be added to any of the food products mentioned above. Therefore, in another aspect, the invention relates to the use of the alginate gel bead of the invention as an additive for a food product.

Dry Surface and Product and Uses of the Alginate Gel Bead for Releasing a Flavor or Fragrance In another aspect, the invention relates to a dry surface comprising the alginate gel bead of the invention, wherein the active ingredient is a flavor and/or fragrance.

The term "dry surface", as used herein, refers to a surface comprising less than 15% of humidity. The surface can be any surface to which the alginate gel beads of the invention can be added and where it is desirable the release of a fragrance and/or flavor at a particular temperature, especially at a temperature between 200 and 240° C. Examples of such surfaces include surface for heating devices, such as ovens, dry tobacco leaves or tobacco products.

In another aspect the invention relates to a product comprising the alginate gel bead of the invention. In a particular embodiment, the product is a dry product, that is, a product comprising less than 15% of humidity. In a more particular embodiment, the product is a tobacco product or tobacco leaves.

In a particular embodiment, the product is a smoking article or a tobacco product, such as cigarettes, pipes and cigars. In a more particular embodiment, the active ingredient is a flavor and/or fragrance. The term "cigarette" includes traditional cigarettes, such as cigarettes for electrical smoking.

A traditional cigarette typically contains two sections, a tobacco-containing portion sometimes referred to as the tobacco or cigarette rod, and a filter portion which may be referred to as a filter tipping. Tipping paper typically surrounds the filter, which forms the mouth end of the cigarette. The tipping paper overlaps with the tobacco rod in order to hold the filter and tobacco rod together. The tobacco rod, or tobacco containing element of the cigarette, includes the paper wrapper in which the tobacco is wrapped and the adhesive holding the seams of the paper wrapper together. The tobacco rod has a first end which is integrally attached to the filter and a second end which is lit or heated for smoking the tobacco. When the tobacco rod is lit or heated for smoking, the smoke travels from the lit end downstream to the filter end of the tobacco rod and further downstream through the filter.

In a particular embodiment, the alginate gel bead of the invention is included in the tobacco filter of the tobacco rod or on a surface of the tobacco mat.

In another aspect, the invention relates to the use of the alginate gel bead of the invention for totally or partially cover or coating a dry surface. The term "dry surface" has been previously defined. In a particular embodiment, the dry surface is a surface of a heating device, dry tobacco leaves or tobacco products.

In another aspect, the invention relates to the use of the alginate gel bead of the invention for releasing a flavor and/or fragrance compound from a dry surface at a temperature between 200-240° C.

Additional Aspects of the Invention

1. A process for preparing alginate gel beads comprising an active ingredient, wherein the process comprises:
   a. mixing a dry alginate salt with a liquid, wherein the liquid is selected from the group consisting of: (i) an aqueous solution, (ii) an oil in water emulsion and (iii) an aqueous suspension, at a ratio between the dry alginate salt and the liquid ranging between 1:5 and 1:0.4 w/w,
  b. adding an active ingredient to the mixture obtained in step (a) and
  c. adding a salt of a water soluble divalent or trivalent cation, thereby obtaining alginate gel beads
or wherein the process alternatively comprises,
  a. mixing a dry alginate salt with a liquid, wherein the liquid is selected from the group consisting of: (i) an aqueous solution, (ii) an oil in water emulsion and (iii) an aqueous suspension, at a ratio between the dry alginate salt and the liquid ranging between 1:5 and 1:0.4 w/w, wherein the liquid further comprises an active ingredient, and
  b. adding a salt of a water soluble divalent or trivalent cation, thereby obtaining alginate gel beads.
2. The process according to aspect 1, wherein the alginate salt is sodium alginate.
3. The process according to any one of aspects 1 or 2, wherein the alginate gel beads have a diameter between 0.15 and 4.00 mm.
4. The process according to any one of aspects 1 to 3, wherein the alginate gel beads have a hardness of more than 1 kg/cm$^2$/g beads.
5. The process according to any one of aspects 1 to 4, further comprising isolating the obtained alginate gel beads by filtration.
6. The process according to any one of aspects 1 to 5, further comprising drying the alginate gel beads.
7. The process according to aspect 6, wherein the drying is performed by fluid bed drying.
8. The process according to any one of aspects 6 or 7, wherein after drying the alginate beads the diameter of the dry alginate beads is from 0.1 mm to 2 mm.
9. The process according to any one of aspects 6 to 8, wherein after drying the alginate beads, the humidity in the dry alginate beads is less than 15% w/w.
10. The process according to any one of aspects 6 to 9, wherein after drying the alginate beads the bulk density of the dry alginate beads is more than 0.7 g/mL.
11. The process according to any one of aspects 1 to 10, wherein the alginate salt has a viscosity between 90 and 1000 mPa·s at concentration 1% w/v in water.
12. The process according to any one of aspects 1 to 11, wherein the ratio between the alginate salt and the liquid in step (a) is between 1:4.5 and 1:0.5% (w/w).
13. The process according to aspect 12, wherein
  if the alginate salt has a viscosity between 90 and 100 mPa·s at concentration 1% w/v in water, the ratio between said alginate salt and the liquid, preferably the aqueous solution, is between 1:0.5 and 1:2.5 (w/w),
  if the alginate salt has a viscosity between 420 and 450 mPa·s at concentration 1% w/v in water, the ratio of said alginate salt and the liquid, preferably the aqueous solution, is between 1:4.0 and 1:0.75 (w/w) and,
  if the alginate salt has a viscosity between 800 and 1000 mPa·s at concentration 1% w/v in water, the ratio of said alginate salt and the liquid, preferably the aqueous solution, is between 1:4.5 and 1:1.25 (w/w).
14. The process according to any one of aspects 1 to 13, wherein the liquid is selected from the group consisting of:
  (i) water,
  (ii) a water solution including at least a water-miscible organic solvent, and
  (iii) an oil in water emulsion, wherein the external phase contains surfactants alone or in combination with water miscible solvents.
15. The process according to any one of aspects 1 to 14, wherein mixing the dry alginate salt with the liquid is performed by addition of the dry alginate salt into the liquid at a flow rate of 20 mL/min under shear mixing between 1500 and 2000 rpm, or by addition of the liquid into the dry alginate salt at a flow rate of 20 mL/min under shear mixing between 1500 and 2000 rpm.
16. The process according to any one of aspects 1 to 15, wherein the divalent or trivalent cation is added in a dry form.
17. The process according to any one of aspects 1 to 16, wherein the divalent cation is calcium.
18. The process according to aspect 17, wherein the salt of the divalent cation is calcium chloride.
19. The process according to aspect 18, wherein the calcium chloride is added to the liquid at a concentration between 1-20% (calcium weight/alginate weight).
20. The process according to aspect 19, wherein the calcium chloride is added to the liquid at a concentration between 5-15% (calcium weight/alginate weight).
21. The process according to any one of aspects 1 to 20, wherein the dry alginate salt is mixed with at least one dry additional polysaccharide different from alginate before mixing the dry alginate salt with the liquid, and wherein the ratio of said additional polysaccharide and the alginate salt in the liquid is between 10:90 and 70:30 (w/w).
22. The process according to aspect 21, wherein the additional polysaccharide is selected from the group consisting of xanthan gum, guar gum, carrageenan and modified starch.
23. The process according to any one of aspects 1 to 22, wherein the active ingredient is added by solution, oil/water emulsion or suspension.
24. The process according to any one of aspects 1 to 23, wherein the active ingredient is selected from the group consisting of a peptide or protein, a flavor and/or fragrance, a microorganism and an insoluble particle of less than 10 μm.
25. The process according to aspect 24, wherein the active ingredient is a flavor and/or fragrance, and wherein the flavor or fragrance retention of said compound in the alginate beads at 220-240° C. under dry or wet conditions is at least 60%.
26. The process according to aspect 25, wherein the flavor and/or fragrance is an essential oil or a crystalline compound.
27. The process according to aspect 26, wherein the essential oil is D-limonene or oregano oil and the crystalline compound is menthol or thymol.
28. The process according to aspect 24, wherein the microorganism is a bacterium of the genus *Rhizobium*.
29. The process according to any one of aspects 1 to 28, wherein the liquid is water.
30. An alginate gel bead comprising an active ingredient obtainable by the process according to any one of aspects 1 to 29.
31. An alginate gel bead comprising an active ingredient, wherein the concentration of alginate in the alginate gel bead is between 15% and 70% w/w.
32. The alginate gel bead according to aspect 31, wherein the alginate gel bead has a diameter between 0.15 and 3.5 mm.

33. The alginate gel bead according to any one of aspects 30 to 32, wherein the alginate gel beads have a hardness of more than 1 kg/cm²/g beads.
34. A food product comprising the alginate gel bead according to aspect 30 or any one of aspects 31 to 33.
35. The food product of aspect 34, wherein said food product is a bakery product.
36. Use of the alginate gel bead according to aspect 30 or any one of aspects 31 to 34 as an additive for a food product.
37. A dry surface comprising the alginate gel bead according to aspect 30 or any one of aspects 31 to 35, wherein the active ingredient is a flavor and/or fragrance.
38. Use of the alginate gel bead according to aspect 30 or any one of aspects 31 to 34 for releasing a volatile flavor or fragrance compound at a temperature between 200-240° C. from a dry surface.

The invention will be described by way of the following examples which are to be considered as merely illustrative and not limitative of the scope of the invention.

Example 1: Manufacturing of Empty Very Dense Hydrated Polysaccharides Beads (DB) with Different Alginate Grade Materials and Methods For the preparation of DB, sodium alginate was divided in three categories according to viscosities. In this context, it has been considered that alginates were (i) low viscosity grade (LV) for viscosity less than 200 mPa·s, (ii) medium viscosity grade (MV) for viscosity between 201 and 700 mPa·s and (iii) high viscosity grade (HV) for viscosity more than 701 mPa·s. Thus, according to supplier specification sheet viscosity, three types of alginate (see table 1) were selected to perform the experiments and were supplied from Ceamsa and Azelis, Spain. All viscosity data are described for 1% alginate aqueous solution w/v and were measured with a viscosimeter RVDV-I, at a temperature of 20° C., with a spindle 2 and at 20 rpm/min of rotational speed.

TABLE 1

Categories of sodium alginate

| Category | Viscosity according to supplier (mPa · s) |
|---|---|
| LV | 90-100 |
| MV | 420-450 |
| HV | 800-1000 |

To obtain DB, 100 g of dry sodium alginate were hydrated by the addition of different amount of distilled water (hydration solution) at slow flow rate (20 mU min) under high shear mixing for 15 min. The mixing process was performed between 18-30° C. Then, the hydrated beads were cross-linked by direct addition of calcium chloride powder to achieve a concentration of 12.5% calcium chloride/dry alginate (w/w) under high shear mixing. Then the beads were left at room temperature for 2 hours incubation without agitation. Finally the hydrated beads were washed with distilled water to eliminate any excess of calcium chloride and collected to be dried by fluid bed dryer at 40° C., air flow 50 L/min, during 1 h.

The adequate range of hydration solution (water) was calculated according to physical properties of the obtained hydrated beads, such as particle size, hardness and shape in order to determine both minimum and maximum acceptable amount range of hydration solution. In this case, the presence of any agglomerations and particle size of the beads were monitored during the manufacturing process by light microscopy (Nikon, H550S, JAPAN), pre and post cross-linking with calcium chloride. The acceptable size range distribution of the hydrated beads was selected to avoid agglomeration and to achieve beads with an adequate hardness (shear force) of more than 1 kg/cm²/g beads, without any deformation or size change of the proper hydrated beads. In this case, 10 g of each type of hydrated beads were spread between two crystal sheets, and then, subjected to different weight force ranged from 0.1 to 2 kg/cm² for 1 min. Then particle size and shape were assayed.

In addition, after drying by fluid bed dryer, size analysis was performed by sieving using different sizes of filter sheets and light microscopy. In addition, humidity of the beads was calculated by gravimetric analysis after heating dry beads at 120° C. during 20 min. The weight loss was considered as residual humidity of the dried DB.

Results

Table 2 summarizes the accepted concentration ranges between hydration solution and dry alginate within individual beads. These ranges have been selected based on assaying the sizes of hydrated DB using a sieving process. Thus, results obtained in table 2 indicate the maximum limit of hydration solution that can be absorbed by dry alginate to maintain acceptable size distribution without beads agglomeration.

TABLE 2

Minimum and maximum acceptable concentrations of different grades of dry alginate within the hydrated DB.

| Sodium alginate grade | Ratio between dry alginate and water (w/w) | | Concentration ranges of alginate within the hydrated bead (% w/w) | |
|---|---|---|---|---|
| | Minimum water | Maximum water | Maximum alginate | Minimum alginate |
| LV | 1:0.5 | 1:2.5 | 66.66% | 28.57% |
| MV | 1:0.75 | 1:4.0 | 57.14% | 20% |
| HV | 1:1.25 | 1:4.5 | 44.4% | 18.18% |

For all alginate grades (LV, MV and HV) it has been considered that the acceptable size range of hydrated DB was between 0.15 and 3.5 mm, for each individual bead. Size analysis of hydrated alginate beads were assayed by light microscopy and sieving technique.

Table 3 indicates the optimum size range, as illustrative example, of beads prepared from different alginate grades with 23.06% (w/w) as dry material within hydrated beads. The size range of the hydrated beads decreases as the viscosity of alginate grade is higher.

An important criterion for the optimization of composition and manufacturing was to achieve sufficient hardness where the hydrated beads can withstand shear force more than 1 kg/cm²/g without any deformation or size change of the proper beads.

TABLE 3

Acceptable size range of hydrated DB prepared from 30 g alginate and 100 mL distilled water (23.06% w/w dry material within the beads).

| Sodium alginate grade | Optimum size range (mm) | Acceptable size range (mm) 90% of population | Bead hardness (kg/cm²/g beads) |
|---|---|---|---|
| LV | 0.2-4 mm | 0.3-3.5 mm | 1.30 |
| MV | 0.2-3 mm | 0.25-3 mm | 1.25 |
| HV | 0.15-3.5 mm | 0.25-2.5 mm | 1.20 |

Figure 4:
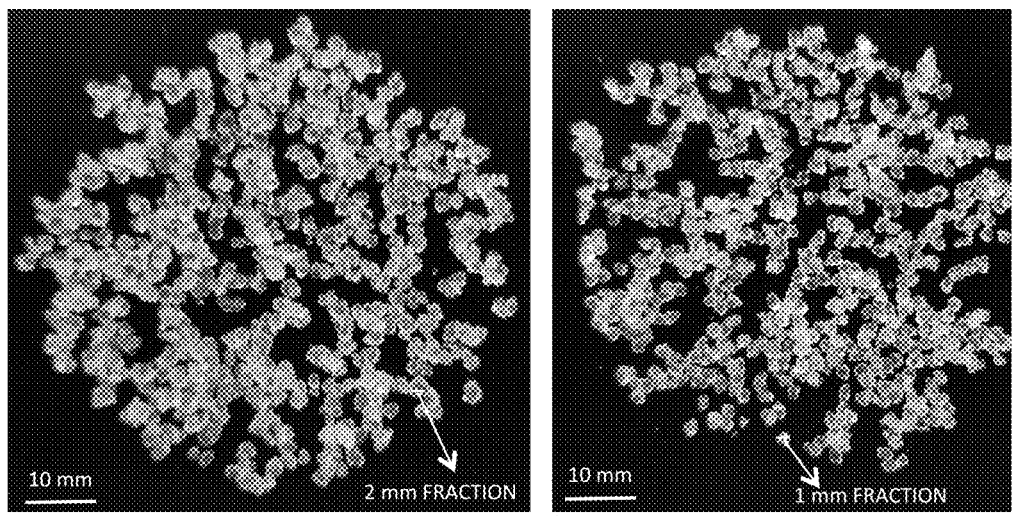
FIG. 4. Light microscopy of hydrated DB as illustrative example.

In FIG. 4 it can be observed, as illustrative example, 1 and 2 mm fraction of hydrated beads without calcium chloride of samples prepared from 30 g MV alginate and 100 mL distilled water (23.06% w/w dry alginate within the beads).

Table 4 shows the size distribution of dry DB prepared from 30 g MV alginate and 100 mL distilled water obtaining 23.06% w/w dry alginate within the beads. The size ranges of dry alginate beads were assumed to be acceptable when 100% of dry beads have a size less than 2 mm. The size for both dry and wet beads has been calculated by sieving process using different sieve sizes. In addition, sizes has been analyzed also by image analysis using optical microscopy.

TABLE 4

Size distribution of dry DB prepared from 30 g alginate and 100 mL distilled water (23.06% w/w dry material within the beads).

| Size (mm) | % Size distribution by weight | | |
|---|---|---|---|
| | LV | MV | HV |
| 1-2 mm | 8.00 (1.00) | 6.00 (1.00) | 3.00 (0.64) |
| 0.5-1 mm | 35.50 (2.00) | 30.00 (4.00) | 25.00 (2.00) |
| 0.25-0.5 mm | 55.50 (1.50) | 62.50 (5.50) | 70.00 (1.50) |
| 0.1-0.25 mm | 1.00 (0.5) | 1.50 (0.56) | 2.00 (1.00) |

Finally, after drying by fluid bed dryer, sieving process was performed for size analysis. Humidity of all types of dried beads has been found to be 3.5-4.3% in all cases.

Example 2. Comparative Studies Between Physical Properties and Macro and Microscopical Structure of Both DB and Conventional Alginate Beads (CB)

Materials and Methods

Calcium cross-liked DB were prepared as in example 1 from MV alginate (viscosity 420-450 mPa·s) at 30% alginate within bead matrix (w/w). Conventional alginate beads (CB) were prepared by the most common, extrusion-dripping method described in Voo et al. (Voo, W.-P., Lee, B.-B., Idris, A., Islam, A., Tey, B.-T., & Chan, E.-S. (2015). Production of ultra-high concentration calcium alginate beads with prolonged dissolution profile. RSC Advances, 5(46): 36687-36695). In this case, MV alginate (viscosity 420-450 mPa·s) was selected. Aqueous solutions of sodium alginate (2 & 6% w/w) were selected to obtain conventional beads (CB) by dipping in calcium chloride solution to obtain cross-linked alginate beads. CB of size range 0.4-3 mm were obtained using different gauge size using a peristaltic pump. In addition, atomization pressure device was used to obtain smaller sizes of CB. Pressurized air mixes with the liquid, forcing liquid droplets out through the orifice of the nozzle (Herrero et al., Chemical Engineering Journal 2006, 117: 137-142). In all cases, the amount of calcium chloride was 12.5% w/w dry alginate and the incubation time was 2 hours. Heating at 80° C. was required to manage alginate solution at 6% in order to reduce the viscosity. After incubation in calcium chloride solution, the hydrated beads were washed with distilled water to eliminate any excess of calcium chloride and were collected to be dried by fluid bed dryer at 40° C., air flow 50 L/min during 1 h.

Shear force (Hardness) test was performed for both hydrated calcium cross-linked DB and CB. In this case, the particle size was selected to be 1000 μm. Then, similar amounts of beads were dispersed on areas between two glass discs surface and subjected to different weight force ranging from 0.1-1 kg/cm$^2$/g during 2 min. The deformation point of the beads was calculated as hardness end point.

For dry beads, density of the beads, shape, size and structure were tested by optical microscopy and Scanning Electron Microscopy (SEM), both cryo-SEM and conventional SEM. For SEM microscopy protocol, SEM conditions applied were field emission scanning with vacuum mode, environmental mode and X-ray energy dispersion microanalysis (FEI Company Quanta FEG 250/EDAX). Then, samples were loaded into the chamber of the FEI Nova 200 Electron Beam combined microscope and focused ion microscope. In the Nova 200 Microscope, Secondary Electron (SE) images of the samples were taken.

The bead density "ρ" was measured for both CB and DB dry beads. The beads were hypothesized to be spherical shape. Their volume was calculated by determining the diameter of the spheres before and after drying by visual image analysis and High Accuracy Digital Micrometer (Mitutoyo, USA). The bead mass was then obtained by weighting the beads with a precision scale balance. Bulk and tap densities also were calculated for both DB and CB beads (size range 0.4-0.50 mm) using measuring cylinder method described elsewhere (Yadav V. D. et al., Formulation and Evaluation of Floating Beads of Norfloxacin. IOSR Journal of Pharmacy, 2016, 6 (9): 7-13).

Results

Figure 5:
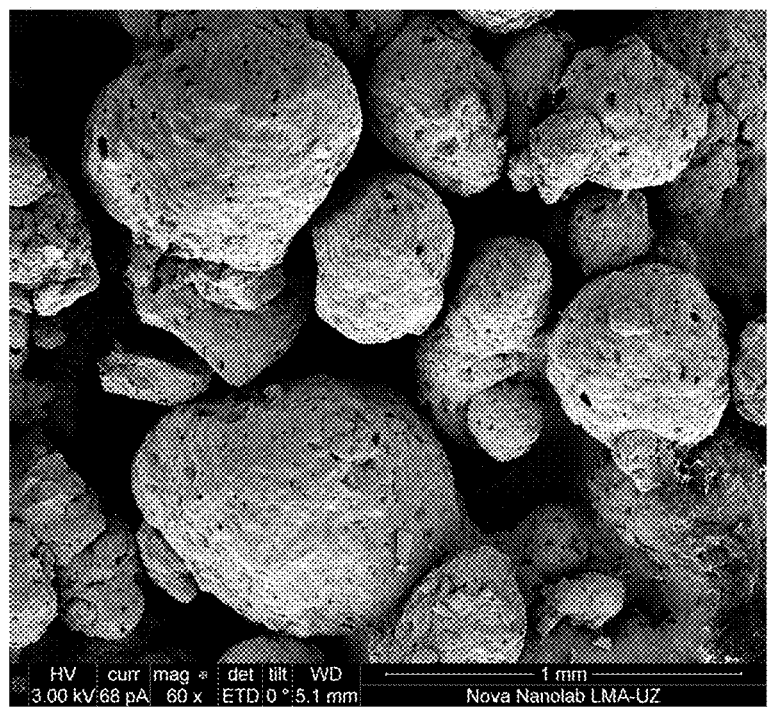
FIG. 5. Scanning electron microscopy (SEM) image of DB.

Morphology of dried DB beads can be observed in FIG. 5 SEM image. Different sizes were observed within the sample, the size ranged from 300-1000 μm.

Figure 6:
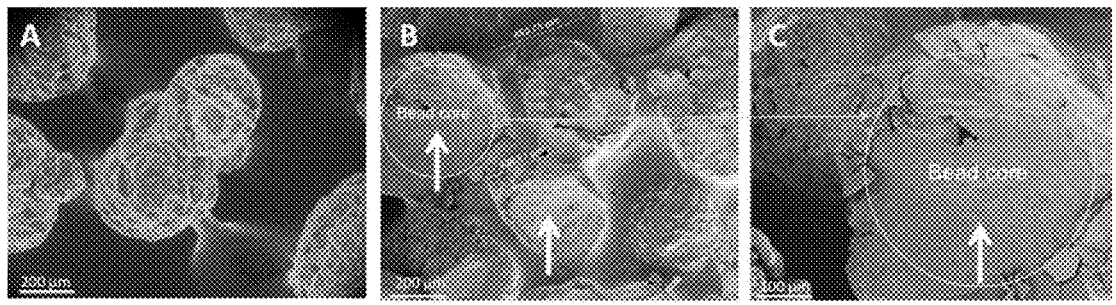
FIG. 6. SEM image of dried DB of size around 500 μm (A), Cross section (Cryo-SEM) bead core structure (B & C).

FIG. 6 shows a SEM image of dry DB (A) and the cross-section (Cryo-SEM) DB core matrix (B&C). In these images, the core of the beads is very compacted and dense due to the concentration of the polymer within the individual DB.

Figure 7:
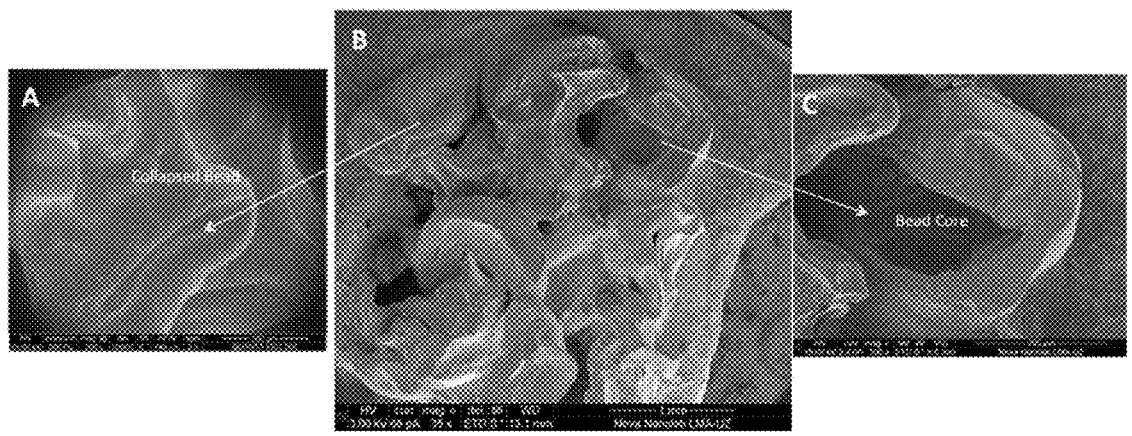
FIG. 7. SEM image of dried conventional alginate beads of size around 500 μm (A), Cross section (Cryo-SEM) bead core structure (B & C).
Figure 8:
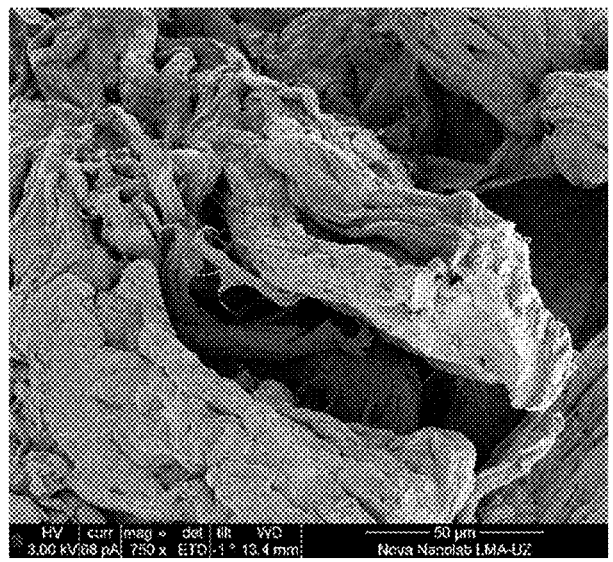
FIG. 8. SEM image of dried conventional alginate beads of size around 500 μm.

SEM images for conventional alginate beads (CB) in FIG. 7 show irregular semi collapsed particles (FIG. 7A). This collapsed structure is due to low density of alginate within the beads, which tend to be of irregular collapsed shape (disc or red blood cell like structure) after evaporation of water by drying. In addition, CB are characterized by the presence of internal big holes (pores) within the matrix and core. FIG. 8 also can corroborate that irregular reticular matrix can be found within the conventional beads.

Bulk and tapped densities of both DB and CB were assayed for the same particle size range that had been separated by sieving between 400-500 μm. Table 5 shows both, bulk and tapped density data. In accordance with Cryo-SEM, where the high density of DB within the cores can be clearly observed, both bulk and tapped densities of DB were approximately 2 times higher than conventional beads.

TABLE 5

Bulk and tapped density of dry conventional and DB alginate beads.

| Calcium cross-linked formulation | Bulk density (ρ) (g/mL) | Tapped density (ρ) (g/mL) |
|---|---|---|
| Conventional alginate beads (CB) of 400-500 μm made from 2% alginate solution | 0.373 | 0.412 |
| Conventional alginate beads (CB) of 400-500 μm made from 6% alginate solution | 0.412 | 0.562 |
| DB alginate beads of 400-500 μm made from MV alginate at 30% alginate within the bead matrix | 0.873 | 0.965 |

Data in table 6 show that the DB can withstand approximately 4 times more force than conventional beads.

TABLE 6

Hardness of hydrated conventional and DB alginate beads.

| Formulation | Hardness (kg/cm$^2$/g beads) |
|---|---|
| Conventional alginate beads (CB) of 1000 μm made from 6% alginate solution | 0.400 |
| DB alginate beads of 1000 μm | 1.6 |

Example 3. Manufacturing of DB with Different Anionic and Neutral Polysaccharides Materials and methods Different polysaccharides were selected according to common physicochemical properties, including as illustrative examples, negatively charged water soluble polysaccharides such as xanthan gum (Guinama, Spain) and carrageenan (seaweeds carrageenan Satiagum™ supplied by Cargill). The neutral and water soluble polysaccharides were selected to be guar gum (Fagron, Spain). The water insoluble polysaccharide was modified starch from corn (ESPA, Spain). These polysaccharides have been considered calcium non cross-linkable ones. Non-charged modified cornstarch and guar gum were selected as neutral polysaccharides.

For this purpose, hydrated DB composed of alginate and different polysaccharides were prepared according to the method described in example 1. Briefly, different ratios between alginate and the selected polysaccharides were used to prepare DB according to tables 7, 8 and 9. The ratios were expressed as w/w dry additional polysaccharides:dry alginate before hydration by water. In all cases, hydration solution was distilled water and the ratio of dry powder in water was 1:1 w/w.

Hydrated beads were evaluated by measuring hardness and the size to check for the presence of agglomerations during manufacturing process. In these cases, hydrated beads that withstand force of 1 kg/cm$^2$/gr beads or more without any deformation or size change of the proper beads were considered acceptable. Sizes of hydrated beads were acceptable if all fraction sizes were lower than 3.5 mm.

Dried formulations were evaluated by measuring the main physical properties such as bulk density, size distribution and humidity as previously described. The size range of dry formulation was considered acceptable if the population of size ranging from 0.25-1 mm was more than 80%. For all types of dry beads, a bulk density of more than 0.700 g/ml was considered acceptable.

TABLE 7

Ratios (w/w/w) between xanthan gum, sodium alginate and water used to prepare DB.

|  | XGDB10:90 | XGDB30:70 | XGDB50:50 | XGDB70:30 | XGDB100 |
|---|---|---|---|---|---|
| Xanthan gum | 10 | 30 | 50 | 70 | 100 |
| Sodium alginate | 90 | 70 | 50 | 30 | 0 |
| Water | 100 | 100 | 100 | 100 | 100 |

TABLE 8

Ratios (w/w/w) between carrageenan, sodium alginate and water used to prepare DB.

|  | CRDB10:90 | CRDB30:70 | CRDB50:50 | CRDB70:30 | CRDB100 |
|---|---|---|---|---|---|
| Carrageenan | 10 | 30 | 50 | 70 | 100 |
| Sodium alginate | 90 | 70 | 50 | 30 | 0 |
| Water | 100 | 100 | 100 | 100 | 100 |

TABLE 9

Ratios (w/w/w) between guar gum, sodium alginate and water used to prepare DB.

|  | GUDB10:90 | GUDB30:70 | GUDB50:50 | GUDB70:30 | GUDB100 |
|---|---|---|---|---|---|
| Guar gum | 10 | 30 | 50 | 70 | 100 |
| Sodium alginate | 90 | 70 | 50 | 30 | 0 |
| Water | 100 | 100 | 100 | 100 | 100 |

It was difficult to obtain CB using the common extrusion-dripping method, because the external phase containing calcium chloride had been transformed to get gel-like structure with high viscosity during manufacturing. The leaching of water soluble polysaccharides, such as xanthan gum or guar gum causes gel formation of calcium chloride solution. For that reason, the conventional formulations (without alginate) were prepared by spray drying technique using 2% polysaccharides solutions. In case of modified starch (water insoluble polysaccharides), the solution was heated previously at 85° C. during 15 min. All types of CB were dried in The Mini Spray-dryer Büchi B191 (Büchi Labortechnik AG, Switzerland) under the following conditions: inlet temperature: 90° C., outlet temperature: 60° C., spray-flow: 600 L/h, and aspirator at 90% of the maximum capacity.

The main physicochemical properties of dried formulations, including bulk density, size distribution and humidly were calculated by gravimetric analysis as previously described. Hardness of hydrated beads was assayed for humid formulations before drying as previously described.

Results

The following tables show the main physical properties of the formulations containing different polysaccharide mixtures before and after drying. The humidity ranges for all compositions were between 3-6% after drying.

According to the size analysis and density measurements, DB with different polysaccharide types were successfully prepared. The acceptable ratio between alginate and polysaccharides to obtain high density beads was labeled as: XGDB10:90, XGDB30:70, XGD1B50:50, and XGDB70:30 in table 10; CRDB10:90, CRD1330:70, CRD1B50:50, CRDB70:30 in table 11; GUDB10:90, GUDB30:70, GUDB50:50, GUDB70:30 in Table 12; and STDB310:90, STD630:70, STD1B50:50, STDB70:30 in table 13.

TABLE 10

Physical properties of the formulations of table 7.

| | XGDB10:90 | XGDB30:70 | XGDB50:50 | XGDB70:30 | XGDB100 | XG Spray dried |
|---|---|---|---|---|---|---|
| Xanthan gum | 10 | 30 | 50 | 70 | 100 | 100 |
| Sodium alginate | 90 | 70 | 50 | 30 | 0 | 0 |
| Humidity after drying | 3.51 | 3.99 | 3.37 | 3.10 | 3.65 | 3.65 |
| Bulk density (p) (g/mL) | 0.854 | 0.824 | 0.82 | 0.79 | 0.71 | 0.35 |
| Size range of dry beads population (mm) | XGDB10:90 (% size) | XGDB30:70 (% size) | XGDB50:50 (% size) | XGDB70:30 (% size) | XGDB100 (% size) | XG Spray dried (% size) |
| 1-2 mm | 2.90 | 6.20 | 10.45 | 13.68 | 55.21 | 6.31 |
| 0.5-1 mm | 48.00 | 50.98 | 54.00 | 57.02 | 33.18 | 65.35 |
| 0.25-0.5 mm | 42.60 | 38.67 | 34.13 | 28.18 | 11.27 | 28.00 |
| 0.1-0.25 mm | 6.50 | 4.15 | 1.42 | 1.12 | 0.34 | 0.34 |
| Shear stress of humid beads | Acceptable | Acceptable | Acceptable | Acceptable | Non-acceptable | — |
| Total % of size range (0.25-1 mm) of dry beads | 90.60 | 89.65 | 88.13 | 85.20 | 44.45 | 93.35 |

TABLE 11

Physical properties of the formulations of table 8

| | CRDB10:90 | CRDB30:70 | CRDB50:50 | CRDB70:30 | CRDB100 | CR Spray dried |
|---|---|---|---|---|---|---|
| Carrageenan | 10 | 30 | 50 | 70 | 100 | 100 |
| Sodium alginate | 90 | 70 | 50 | 30 | 0 | 0 |
| Size distribution of humid beads | Acceptable | Acceptable | Acceptable | Acceptable | Non-acceptable | — |
| Humidity after drying | 3.67 | 3.1 | 3.32 | 4.12 | 3.64 | 3.22 |
| Bulk density (p) (g/mL) | 0.912 | 0.897 | 0.863 | 0.87 | 0.865 | 0.42 |
| Size range of dry beads population (mm) | CRDB10:90 (% size) | CRDB30:70 (% size) | CRDB50:50 (% size) | CRDB70:30 (% size) | CRDB100 (% size) | CR Spray dried (% size) |
| 1-2 mm | 3.10 | 5.65 | 6.34 | 5.32 | 3.43 | 10.34 |
| 0.5-1 mm | 50.11 | 50.98 | 50.54 | 48.34 | 45.43 | 60.23 |
| 0.25-0.5 mm | 44.81 | 41.27 | 40.56 | 44.32 | 49.16 | 27.98 |
| 0.1-0.25 mm | 1.98 | 2.10 | 2.56 | 2.02 | 1.98 | 1.45 |
| Hardness of humid beads | Acceptable | Acceptable | Acceptable | Acceptable | Non-acceptable | — |

TABLE 11-continued

Physical properties of the formulations of table 8

| | CRDB10:90 | CRDB30:70 | CRDB50:50 | CRDB70:30 | CRDB100 | CR Spray dried |
|---|---|---|---|---|---|---|
| Total % of size range (0.25-1 mm) of dry beads | 94.92 | 92.25 | 91.10 | 92.66 | 94.59 | 88.21 |

TABLE 12

Physical properties of the formulations of table 9.

| | GUDB10:90 | GUDB30:70 | GUDB50:50 | GUDB70:30 | GUDB100 | GU Spray dried |
|---|---|---|---|---|---|---|
| Guar Gum | 10 | 30 | 50 | 70 | 100 | 100 |
| Sodium alginate | 90 | 70 | 50 | 30 | 0 | 0 |
| Size distribution of humid beads | Acceptable | Acceptable | Acceptable | Acceptable | Non-acceptable | — |
| Humidity after drying | 3.65 | 3.34 | 3.88 | 3.99 | 3.23 | 3.67 |
| Bulk density (p) (g/mL) | 0.898 | 0.856 | 0.854 | 0.876 | 0.806 | 0.47 |
| Size range of dry beads population (mm) | GUDB10:90 (% size) | GUDB30:70 (% size) | GUDB50:50 (% size) | GUDB70:30 (% size) | GUDB100 (% size) | GU Spray dried (% size) |
| 1-2 mm | 4.12 | 5.13 | 5.83 | 6.13 | 6.54 | 15.86 |
| 0.5-1 mm | 52.43 | 60.13 | 55.43 | 48.56 | 43.86 | 55.86 |
| 0.25-0.5 mm | 42.89 | 33.62 | 37.40 | 43.77 | 48.26 | 27.67 |
| 0.1-0.25 mm | 0.56 | 1.12 | 1.34 | 1.54 | 1.34 | 0.61 |
| Hardness of humid beads | Acceptable | Acceptable | Acceptable | Acceptable | Non-acceptable | — |
| Total % of size range (0.25-1 mm) of dry beads | 95.32 | 93.75 | 92.83 | 92.33 | 92.12 | 83.53 |

TABLE 13

Physical properties of DB formulations including modified starch and sodium alginate.

| | STDB10:90 | STDB30:70 | STDB50:50 | STDB70:30 | STDB100 | ST Spray dried |
|---|---|---|---|---|---|---|
| Modified Starch | 10 | 30 | 50 | 70 | 100 | 100 |
| Sodium alginate | 90 | 70 | 50 | 30 | 0 | 0 |
| Size distribution of humid beads | Acceptable | Acceptable | Acceptable | Acceptable | Non-acceptable | — |
| Humidity after drying | 3.04 | 3.56 | 3.54 | 4.32 | 4.12 | 3.05 |
| Bulk density (p) (g/mL) | 0.986 | 0.954 | 0.956 | 0.91 | 0.903 | 0.32 |

TABLE 13-continued

Physical properties of DB formulations including modified starch and sodium alginate.

|  | STDB10:90 | STDB30:70 | STDB50:50 | STDB70:30 | STDB100 | ST Spray dried |
|---|---|---|---|---|---|---|
| Size range of dry beads population (mm) | STDB10:90 (% size) | STDB30:70 (% size) | STDB50:50 (% size) | STDB70:30 (% size) | STDB100 (% size) | ST Spray dried (% size) |
| 1-2 mm | 5.34 | 5.46 | 5.74 | 5.98 | 6.55 | 4.60 |
| 0.5-1 mm | 52.43 | 60.13 | 55.43 | 48.56 | 43.86 | 55.86 |
| 0.25-0.5 mm | 39.67 | 31.74 | 35.81 | 43.01 | 46.70 | 37.56 |
| 0.1-0.25 mm | 2.56 | 2.67 | 3.02 | 2.45 | 2.89 | 1.98 |
| Hardness of humid beads | Acceptable | Acceptable | Acceptable | Acceptable | Non-acceptable | — |
| Total % of size range (0.25-1 mm) of dry beads | 92.10 | 91.87 | 91.24 | 91.57 | 90.56 | 93.42 |

Example 4. Manufacturing of DB with Water Miscible Solvent (WMS)

Materials and Methods

Hydrated DB beads were prepared as example 1 using MV alginate. In this case, the water was used to achieve alginate within the hydrated beads to be 44.44% (w/w), which means 125 mL water and 100 g MV alginate (1:1.25 alginate:water ratio). WMS were propylene glycols (PG), glycerol, polyethylene glycol (PEG400) and absolute ethanol. Then, different amounts of volatile and non-volatile water miscible solvents (WMS) were added slowly to the hydrated beads under high shear mixing. The end point (the optimized amount of WMS) was calculated by monitoring physical properties of hydrated beads including size and hardness as described in examples 1 & 2. These water miscible solvents have been selected as illustrative examples, which may act as solvents of some hydrophobic molecules such as essential oils. Beads then were cross-linked, washed and dried as described in example 1.

Results

The end point (end point ratio by weight (alginate:water:WMS)) in table 14 means the maximum amount of WMS that allows to obtain acceptable bead hardness (more than 1 kg/cm$^2$/g beads) and acceptable size range of both wet and dry beads according to the established criteria in table 3 and 4, example 1. Table 14 shows that different WMS allowed obtaining DB with similar physical properties to original beads obtained in example 1.

TABLE 14

DB alginate beads obtained with different water miscible solvents.

| Water miscible solvent | End point ratio by weight (alginate:water:WMS) | Total maximum amount of WMS expressed as % w/w |
|---|---|---|
| Propylene glycols (PG) | 1:1.25:1.3 | 36.61 |
| Glycerol | 1:1.25:1.2 | 34.78 |
| Polyethylene glycol (PEG400) | 1:1.25:0.85 | 27.41 |
| Ethanol | 1:1.25:0.75 | 25.00 |

Example 5. Encapsulation of Hydrophilic Molecules in DB and Assay of Release Profile Materials and Methods A fluorescent labelled bovine serum albumin (FITC-BSA) was used as hydrophilic big size molecule and rhodamine B (RB) as small hydrophilic molecule model (Sigma, Spain).

For that purpose, 100 mL of an aqueous solution of fluorescein isothiocyanate labelled bovine serum albumin (FITC-BSA) or RB at a concentration of 0.1 mg/mL were added slowly to 40 g MV alginate under high shear mixing, as example 1. Then, the beads were cross-linked using dry calcium chloride allowing percentage of calcium chloride to alginate to be 12.5% w/w as described in example 1. Finally, a sample of the cross-linked hydrated beads was washed with distilled water and collected by filtration for further drying.

Conventional alginate beads (CB) loaded with FITC-BSA or RB were prepared by dissolving 10 mg FITC-BSA in 100 mL sodium alginate MV (4% w/w). The solution of alginate was heated to 50° C. to reduce its viscosity. Then, beads were obtained by dipping alginate solution in calcium chloride solution and left under mild stirring during 2 hours. Finally, beads were washed with distilled water and collected for further drying by fluid bed dryer.

For further assay, dry beads of a size range between 400-500 μm were selected. Then, the quantity of loaded FITC-BSA or RB was assayed after hydrolysis of certain amount of dry alginate beads in carbonate buffer (pH8) with 30 mM EDTA for 4 hours at 37° C. Calibration curves were prepared with FITC-BSA or RB standard solutions at a concentration range from 1 to 20 μg/mL (r=0.996). The assay for FITC-BSA was performed by spectrofluorimetry at 480 nm (excitation wavelength) and 520 nm (emission wavelength) in a Bio-tek Synergy™ HT Multi-Detection Microplate Reader. For RB assay, the amount of the RB loaded into the beads was determined by colorimetry at 540 nm. For that purpose, calibration curves were prepared with RB standard solutions at a concentration range from 10 to 100 μg/mL (r=0.996). The percentage of encapsulated molecules was considered as the % encapsulation efficiency (% EE). The % EE was calculated as the amount of encapsulated hydrophilic molecules over the initial amount of hydrophilic molecules.

In vitro release was studied in PBS pH 7.4 10 mM. For that purpose, 1 g of each dry formulation loaded with FITC-BSA or RB was dispersed in 100 mL and incubated for 24 h at 37±1° C. At different times (1, 2, 3, 4 and 6, 8, 12 & 24 h) the formulations were centrifuged at 5000×g for 10 min and the supernatants were collected to calculate the percentage of released molecule.

Results

Table 15, describes the encapsulation efficiencies (% EE) for both DB and conventional beads (CB) loaded with RB and FITC-BSA. The results indicated that the % EE for DB was approximately 2 times higher than CB for both molecules.

TABLE 15

Encapsulation efficiencies for DB and CB beads loaded with RB and FITC-BSA.

| Calcium cross-linked formulation | % Encapsulation efficiency (EE) |
| --- | --- |
| Conventional alginate beads (CB) loaded with RB | 34.12% |
| Conventional alginate beads (CB) loaded with FITC-BSA | 41.33% |
| DB beads loaded with RB | 98.33% |
| DB beads loaded with FITC-BSA | 99.67% |

Figure 9:
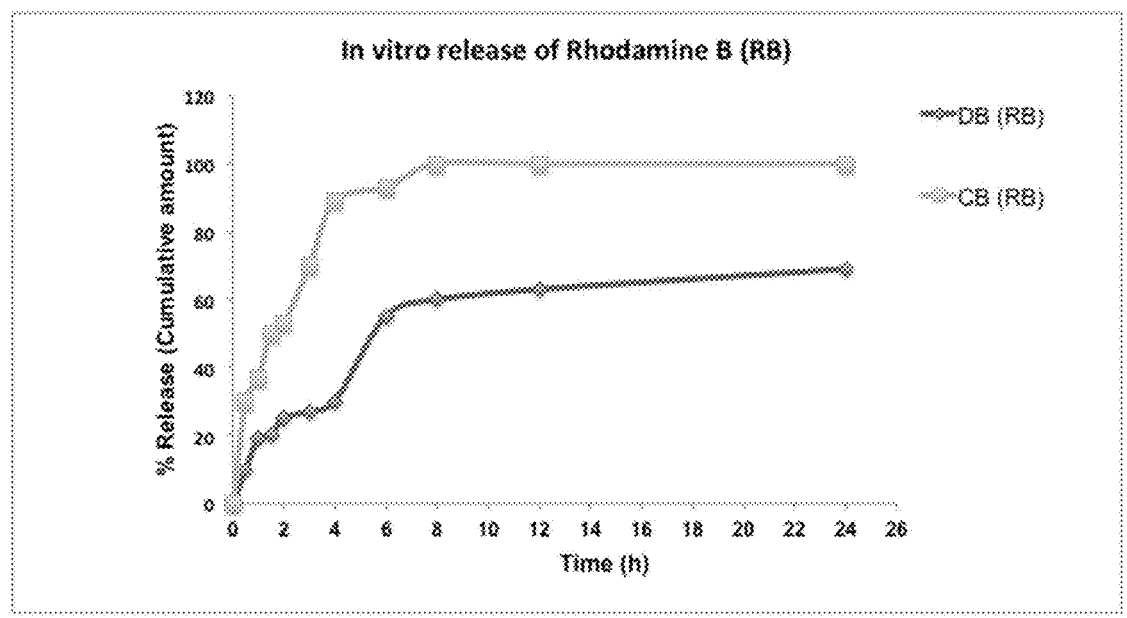
FIG. 9. In vitro release profile of rhodamine B (RB) from high density beads (DB) and conventional ones (CB).
Figure 10:
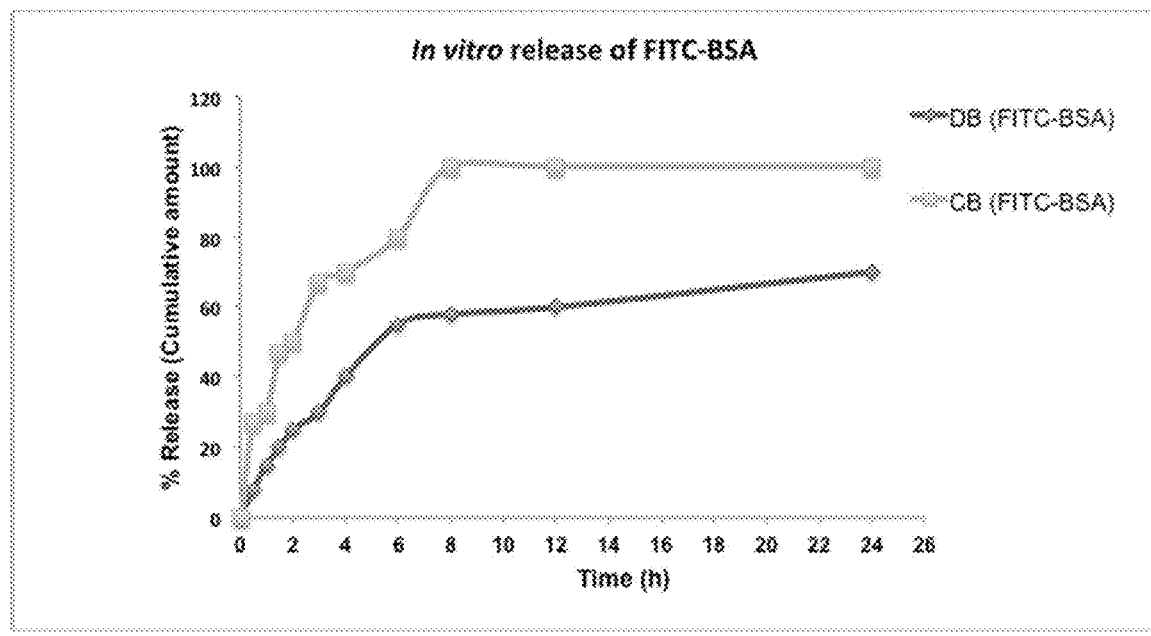
FIG. 10. In vitro release profile of FITC-BSA from high density beads (DB) and conventional ones (CB).

FIGS. 9 and 10 show the cumulative release profile of the formulations. For both FITC-BSA and RB, the release profile for conventional beads was characterized by fast releasing the loaded molecules achieving 100% release within 4-5 hours. DB showed a more sustained and slower release profile that is related to the high density of alginate within the proper beads (FIGS. 9 and 10). On the other hand, in both cases, the release of large molecules such as BSA was slower than the release of a small molecule such as RB due to the big molecule size (protein round 60 kDa) in both types of beads compared to small molecules.

Example 6. Ex Vivo Mucosal Affinity Study of DB in Porcine Buccal Mucosa

Materials and Methods

The ex vivo bioadhesion study was performed using formulations fluorescently labeled with RB obtained in Example 5.

For this purpose, porcine heads were obtained from a local slaughterhouse and the buccal mucosa was surgically isolated and cut in 2 cm² circular areas. Then, tissue samples were stored in PBS at 4° C. and used within 24 hour. Tissue samples were fixed between two flat flanges of Franz cell compartments. For sample application to the mucosal surfaces, one side of the donor compartment (1 cm² of the tissue buccal mucosa tissue) was exposed to dry formulations for 1, 2, 10 & 30 min. In this case, the RB loaded formulations were (i) 500 mg of DB (Size range 400-500 µm), (i) 500 mg of CB (Size range 400-500 µm) and RB solution containing the same amount of RB. Then, samples were removed from the compartment by washing with PBS pH7.4, 10 mM. 1 cm² area of tissue samples which were exposed to the sample during the experiment, were cut and isolated.

For tissue digestion and RB extraction from the adhered formulations, each tissue was digested in 1 mL NaOH 3M for 12 h. Then, samples were diluted with methanol water mixture (1:3) and centrifuged at 3000×g during 15 min to eliminate undesired tissue fractions. Finally the amount of adhered formulations was calculated by qualification of the amount of RB released from spectrofluorimetry at 540 nm (excitation wavelength) and 580 nm (emission wavelength).

Results

Figure 11:
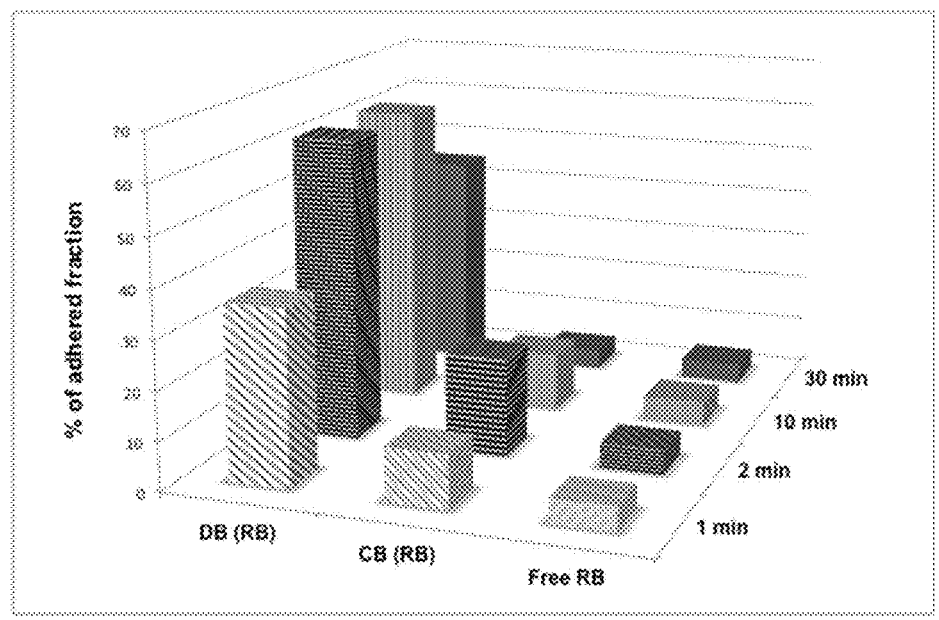
FIG. 11. Percentage of the adhered fraction after the application of the rhodamine B formulations (RB) from high density beads (DB) and conventional ones (CB) in buccal mucosa for different times.

FIG. 11 shows that the bioadhesive capacity of DB loaded with RB was higher than the conventional ones and free RB for all time-point. In all cases, the maximal adhesion was achieved within two minutes post the initial contact with buccal mucosa. For both conventional beads (CB) and free RB, the adhesion capacity was decreased around 5% at 30 min. However, in case of DB, the adhesive fractions were higher for all times and maintained around 60% of the initial amount from 2 to 30 min. This higher adhesive capacity of the beads may relate to the high density of the bioadhesive polymer, alginate, within the individual beads.

Example 7. Encapsulation of a Fluorescent Probe Hydrophobic Molecule Model in DB Using Water Miscible Solvents Materials and Methods In order to investigate the capacity of DB to entrap hydrophobic molecules, the lipophilic fluorescent probe 1,1'-dioctadecyl-3,3,3',3'-tetramethylindocarbocyanine perchlorate (DTP, Sigma, Spain) was selected as hydrophobic molecule. For that purpose, 1 mg of 1,1'-dioctadecyl-3,3,3',3'-tetramethylindocarbocyanine perchlorate was dissolved in aqueous solutions of either both propylene glycol (PG) or absolute ethanol as co-solvents for the lipophilic molecules. The ratio of water:alginate: WMS was (1:1.25 0.5 w/w). For the preparation of DB, 15 mL of DTP solution were added slowly to 4 g MV alginate under high shear mixing, as example 1. Then the beads were cross-linked using dry calcium chloride for 2 hours allowing percentage of calcium chloride to alginate to be w/w (12.5%). Finally, the cross-linked hydrated beads were washed by distilled water and recollected by filtration for further drying.

Conventional alginate beads loaded with DTP were prepared dissolving DTP in 50 ml of either PG or ethanol as WMS. Then, 50 mL of WMS were added to 100 mL sodium alginate MV (4% w/w). Then, 400-500 µm size cross-linked CB, were obtained by dipping alginate solution containing DTP in calcium chloride solution. Finally, beads were washed with distilled water and recollected for further drying by fluid bed dryer.

On the other hand, the lipophilic fluorescent probe 1,1'-dioctadecyl-3,3,3',3'-tetramethylindocarbocyanine perchlorate was suspended in 15 mL distilled water at concentration 2% w/v. Then, the solution was subjected during 20 min to ultrasonic force to decease particles size of the suspension to be about 90% of 1 µm Then, both conventional and DB were prepared as described before.

For further assay, beads of a size range between 400-500 µm have been selected. Then, the quantity of loaded DTP was assayed post hydrolysis of certain amount of alginate beads in carbonate buffer (pH 8) with 30 mM EDTA for 4 hours at 37° C. Calibration curves were prepared with DTP standard solutions at a concentration range from 0.5 to 10 µg/mL (r=0.996).

The percentage of encapsulated molecules was considered as the % encapsulation efficiency (% EE). The % EE was calculated as the amount of encapsulated hydrophilic molecules over the initial amount of hydrophilic molecules within certain amount of beads. The encapsulated DTP was assayed by spectrofluorimetry at 540 nm (excitation wavelength) and 580 nm (emission wavelength).

Results

Table 16 shows the percentage of encapsulation efficiencies (% EE) for both DB and conventional beads (CB) loaded with DTP as hydrophobic molecule. The results indicated that the % EE for DB was approximately 2 times higher than CB for both molecules.

TABLE 16

| Calcium Cross-linked Formulation loaded with DTP | % Encapsulation efficiency (EE) |
|---|---|
| Conventional alginate beads (CB) loaded with DTP obtained using Ethanol | 54.42% |
| Conventional alginate beads (CB) loaded with DTP obtained using PG | 41.33% |
| Conventional alginate beads (CB) loaded with DTP obtained using suspension | 45.65% |
| DB loaded with DTP obtained using Ethanol | 82.55% |
| DB loaded with DTP obtained using PG | 89.43% |
| DB loaded with DTP obtained using suspension | 97.13 % |

Example 8. Preparation of DB Containing Volatile Essential Oils (EOs) and Volatile Crystalline Compounds as Aroma/Flavour Models Materials and Methods An essential oil is a concentrated hydrophobic liquid containing volatile aroma compounds from plants. Essential oils (EOs) are also known as volatile oils, which are usually water insoluble liquids with high volatility. In this case, it has been selected some examples of volatile substances such as essential oils (D-limonene clove oil) and volatile crystalline compounds (Menthol, Thymol). All reagents have been supplied from (Sigma, Spain).

In order to investigate the capacity DB to entrap volatile compounds, 5 g of the corresponding oils, menthol and thymol were dissolved in 20 mL PG, Ethanol, tween 80 or Caprylocaproyl macrogol-8/polyoxyl-8 glycerides (Labrasol®) as water miscible solvents (WMS). For the preparation of DB-loaded with volatile compounds, 80 mL of water were added slowly to 30 g MV alginate under high shear mixing, as explained in example 1. Then 25 mL of volatile compounds solution in WMS were added to the hydrated beads and homogenized under high shear mixing for 15 min. Then the beads were cross-linked using calcium chloride as example 1. Finally, cross-linked hydrated beads were washed by distilled water and recollected by filtration for further drying by fluid bed dryer.

Conventional alginate beads loaded with same volatile substances were prepared by mixing 80 mL sodium alginate MV (4% w/w) with 25 ml PG or ethanol or laborasol at the same ratio containing 5 g of volatile substance, menthol or thymol. The solution of alginate was heated to 50° C. to reduce its viscosity. Then beads were obtained by dipping alginate solution in calcium chloride solution to obtain cross-linked alginate beads. Finally, beads were washed with distilled water and recollected for further drying by fluid bed dryer.

The physical properties such as hardness and bead size for humid and dry ones have been assayed as described in both example 1 and example 2. All formulations have been found adequate and comply with the acceptable size range and hardness. 400-500 μm size dry beads were selected for further assay and quantification.

Quantification of clove oil loaded within the beads was conducted by using spectrophotometry (Soliman et al, Journal of Encapsulation and Adsorption Sciences, 2013, 3: 48-55) with a slight modification. The amount of clove oil entrapped in both DB and conventional ones (CB) was quantified by extracting the loaded oil from 0.5 g of dry beads by dissolving the beads in 5 mL of sodium citrate (0.055 M) and 5 mL n-hexane. The absorbance was then measured at 280 nm wavelength for clove oil. The amount of clove oil was calculated from standard curves using dissolved alginate beads as a control.

The menthol encapsulation efficiency in the beads was calculated using gas chromatography as described elsewhere (Kalgutkar R et al, Analytical chemistry, an Indian Journal, vol 16, issue 1, 2016). For this purpose, Menthol was extracted from the beads with methanol using high shear mixing of a known amount of dry beads during 30 min at room temperature. Then analysis was performed on Agilent 6890 with auto sampler. The column used was Agilent DB-1 30 m×0.32×1.0 μm. Nitrogen was the carrier gas at injector temperature was at 250° C. and the oven temperature was kept 100° C. initial for 2 minutes, then raised up to 250° C. for (25 min) at the rate of 10° C. The carrier gas flow was kept at 1 ml/min.

For assay of the encapsulation efficiency of D-limonene, Gas chromatography was used as described elsewhere (Rubiano, Karla D. et al. Ing. compet. 2015, vol. 17, n.2). For this purpose, 5 ml of distilled water was added to 100 mg of the dry beads. Then, 10 ml methanol was added and the mixture, shaked for 10 min and centrifuged at 3000 rpm for 20 min. Each sample was analyzed by gas chromatography coupled to mass spectroscopy by injecting 2 mL into the chromatograph (TRACE Ultra Gas Chromatography, Thermo Scientific, USA), packed column (PEG-20M). The chromatographic conditions were the following: aflame ionization detector FID) of 230° C. with Nitrogen as the carrier gas. The column temperature was controlled at 120° For assay of the encapsulation efficiency of thymol, 50 mg beads were dispersed in methanol and left under high shear mixing during 10 min. Then, samples were filtered and quantified by means of HPLC-UV. An Agilent 1260 Infinity system equipped with a high sensitivity flow cell and a thermostatized column compartment was used. 10 μL of the extracted samples were injected onto an Agilent Zorbax SB-C18 column set at 25° C. The mobile phase was a mixture of ACN:H$_2$O (50:50) pumped at 2.0 mL/min. The detection was performed at 220 nm. The analyte was eluted at 7.5 minutes.

Results

Table 17 describes the encapsulation efficiencies of both DB and CB loaded with EOs D-limonene, and clove oil or crystalline volatile substance such as menthol and thymol. In all cases, the encapsulation efficiencies were at least 2-3 times higher for DB compared with CB. In addition. The use of PG and Tween 80 increased the encapsulation efficiency in case of DB, which as not observed for CB.

TABLE 17

| Calcium Cross-linked formulations loaded with volatile compounds | Encapsulation efficacy % (w/w) of volatile compounds | | | |
|---|---|---|---|---|
| | D-limonene | Clove oil | Menthol | Thymol |
| Conventional alginate beads (CB) using Ethanol | 20.33 | 21.67.23 | 30.64 | 29.00 |
| Conventional alginate beads (CB) obtained using PG | 32.05 | 26.71 | 32.56 | 32.12 |
| Conventional alginate beads (CB) obtained using Labrasol | 26.99 | 17.18 | 32.43 | 30.04 |
| Conventional alginate beads (CB) using Tween 80 | 22.64 | 19.06 | 20.43 | 26.88 |
| DB loaded with EOs obtained using Ethanol | 73.05 | 66.05 | 65.33 | 65.98 |

TABLE 17-continued

| Calcium Cross-linked formulations loaded with volatile compounds | Encapsulation efficacy % (w/w) of volatile compounds | | | |
|---|---|---|---|---|
| | D-limonene | Clove oil | Menthol | Thymol |
| DB loaded with EOs obtained using PG | 94.13 | 89.34 | 88.30 | 94.20 |
| DB loaded with EOs obtained using Labrasol | 56.88 | 54.23 | 56.43 | 56.41 |
| DB loaded with EOs obtained using Tween 80 | 78.89 | 77.34 | 85.90 | 83.40 |

Example 9. Preparation of DB Containing Volatile Essential Oils (EOs) and Volatile Crystalline Compounds as Aroma/Flavour Models by Emulsification Technique Materials and Methods In order to investigate the capacity of DB to entrap volatile compounds, 5 g of the corresponding essential oils, menthol and thymol, described in example 8, were emulsified in 100 ml aqueous solutions containing 3% tween 80 surfactants (w/w) under high shear mixing during 10 min (ultra-sonic force). Formulations were prepared using 5% w/w of water miscible solvents (PG, Ethanol, labrasol) as co-surfactants that were previously mixed with volatile molecules before emulsification in the aqueous solution of tween 80. The emulsification process using high shear mixing allowed obtaining stable nanoemulsion of 150-200 nm oil droplets particles. The size has been monitored and measured by Brookhaven 90Plus Particle Size Analyzer (Brookhaven, USA).

For the preparation of DB-loaded with essential oils, 100 mL the nanoemulsions with or without co-surfactants were added slowly to 30 g MV alginate under high shear mixing, as example 8, at 40° C. Then the beads were cross-linked using calcium chloride for 2 hours allowing percentage of calcium chloride to alginate to be w/w (12.5%). Finally, 1 g sample of the cross-linked hydrated beads were washed by distilled water and recollected by filtration for further drying by fluid bed dryer.

Conventional alginate beads loaded with same essential oils were prepared by dissolving sodium alginate MV (4% w/w) in nanoemulsion solutions. The solution of alginate was heated to 50° C. to reduce its viscosity. Then beads were obtained by dipping alginate in calcium chloride solution to obtain cross-linked alginate beads. Finally, beads were washed with distilled water and recollected for further drying by fluid bed dryer.

The encapsulation efficacies were calculated as example 8 for dry beads of similar size range as example 8 (400-500 µm).

Results

Table 18 describes the encapsulation efficiencies of both DB and CB loaded using emulsion technique and loaded with EOs D-limonene, clove oil crystalline volatile substance, menthol and thymol. Similar results than example 8 have been obtained. The encapsulation efficiencies were at least 2-3 times higher for DB compared with CB. Similarly, PG and Tween 80 increased the encapsulation efficiency in case of DB, which as not observed for CB.

TABLE 18

| Calcium Cross-linked formulations loaded with volatile compounds and prepared by emulsion technique | Encapsulation efficacy % (w/w) of volatile compounds | | | |
|---|---|---|---|---|
| | D-limonene | Clove oil | Menthol | Thymol |
| Conventional alginate beads (CB) obtained using Ethanol | 22.18 | 18.23 | 33.84 | 31.90 |
| Conventional alginate beads (CB) obtained using PG | 35.12 | 28.28 | 38.43 | 36.82 |
| Conventional alginate beads (CB) obtained using Labrasol | 31.65 | 21.98 | 36.22 | 35.34 |
| Conventional alginate beads (CB) obtained using tween 80 without co-surfactants | 35.55 | 23.22 | 34.76 | 32.65 |
| DB loaded with EOs obtained using Ethanol | 77.55 | 74.06 | 73.05 | 71.34 |
| DB loaded with EOs obtained using PG | 93.11 | 89.00 | 91.36 | 90.06 |
| DB loaded with EOs obtained using Labrasol | 52.63 | 56.54 | 58.13 | 50.39 |
| DB loaded with EOs obtained using tween 80 without co-surfactants | 80.76 | 81.75 | 80.45 | 83.75 |

Example 10. Preparation of DB Containing Thymol and Mineral or Vegetable Oils by Emulsification Technique Materials and Methods Water immiscible oils such as food grade Medium chain triglycerides (MCT), wheat germ oil, and triacetin were supplied from Sigma (Spain). These oils were used as thymol solvents. For this purpose, 1 g of thymol was dissolved in 10 mL of the oils. Then, oily phase was emulsified in 90 ml aqueous solutions containing 3% tween 80 surfactant (3 w/w) under high shear mixing during 10 min (ultra-sonic force) to obtain stable oil droplets nanoemulsion of 150-200 nm. Then, both DB and CB were prepared and evaluated including the calculations of encapsulation efficacies as example 9 for dry beads of similar size range 400-500.

Results

TABLE 19

| Calcium Cross-linked formulation prepared by emulsion technique using oils | Encapsulation efficacy % (w/w) of Thymol |
|---|---|
| Conventional alginate beads (CB) obtained using MCT | 30.60 |
| Conventional alginate beads (CB) obtained using Triacetin | 34.12 |
| Conventional alginate beads (CB) obtained using Wheat Germ oil | 36.68 |
| DB loaded with EOs obtained using MCT | 78.31 |
| DB loaded with EOs obtained using Triacetin | 91.16 |
| DB loaded with EOs obtained using Wheat Germ oil | 86.34 |

Example 11. Thermal Stability and Heat Release of Flavour Under Dry and Wet Conditions Materials and Methods Thymol loaded formulations have been prepared as described in example 8. The thermal stability was assayed for both DB and conventional beads (CB) by heating volatile flavor substances. The test was performed under humid (wet) and dry conditions for samples described in example 8, prepared from PG. Dry beads of a size range between 400 and 500 µm has been selected to perform heat stability study under dry conditions. For humid conditions, both freshly prepared DB and CB have been used without drying process. The samples were heated in high precision hot plat surface at different temperatures from 25-250° C. for 3 min at each temperature. Beads were collected post heating for each temperature and then, thymol was extracted from beads by methanol and assayed as described above (example 8) using HPLC-UV (Agilent 1260 Infinity system).

The percentage of thymol loss was plotted for each temperature range.

Results

Figure 12:
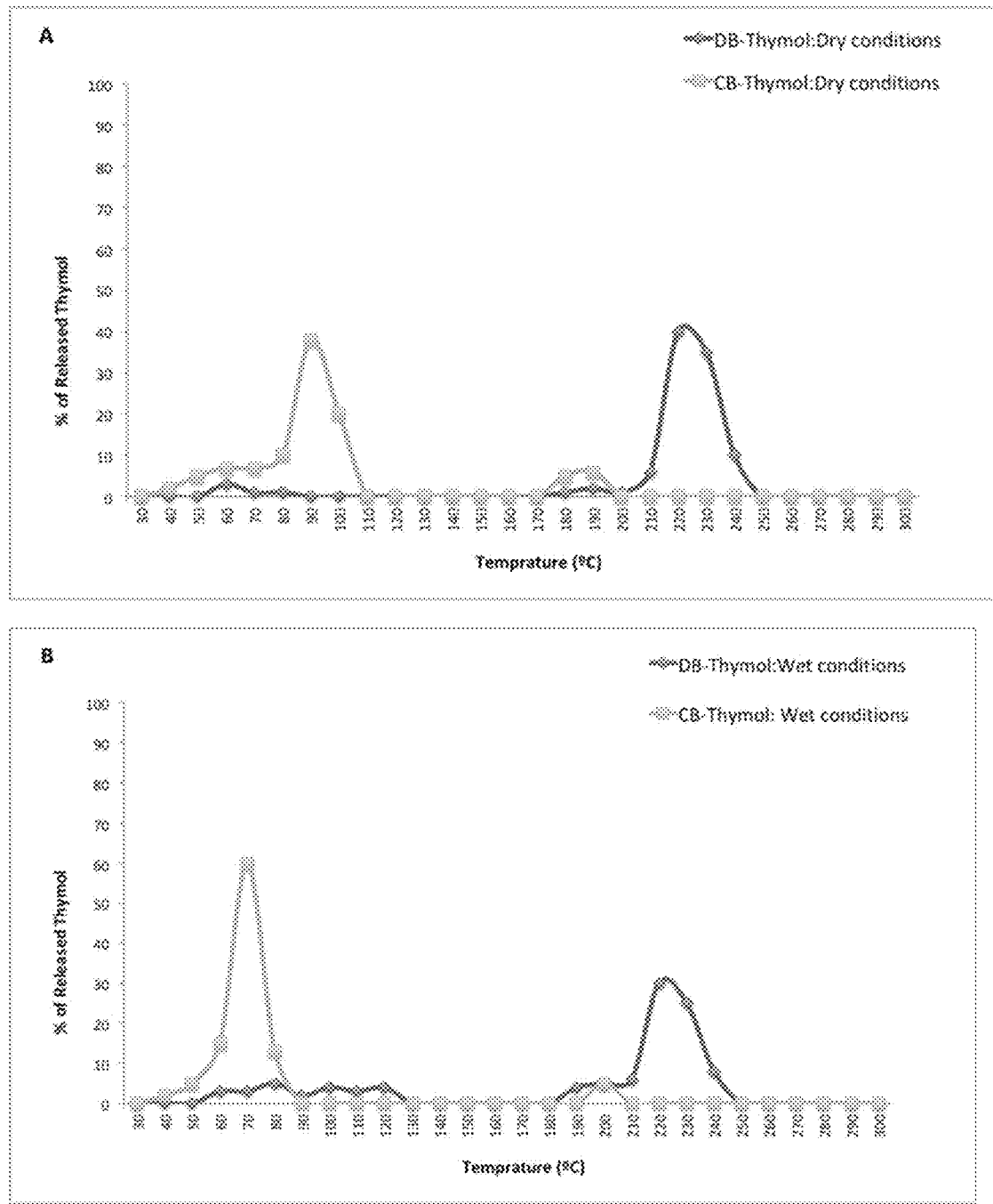
FIG. 12. Thermal release profile of loaded aroma in both conventional (CB) and high density beads (DB) formulations under dry (A) and wet (B) conditions.
Figure 13:
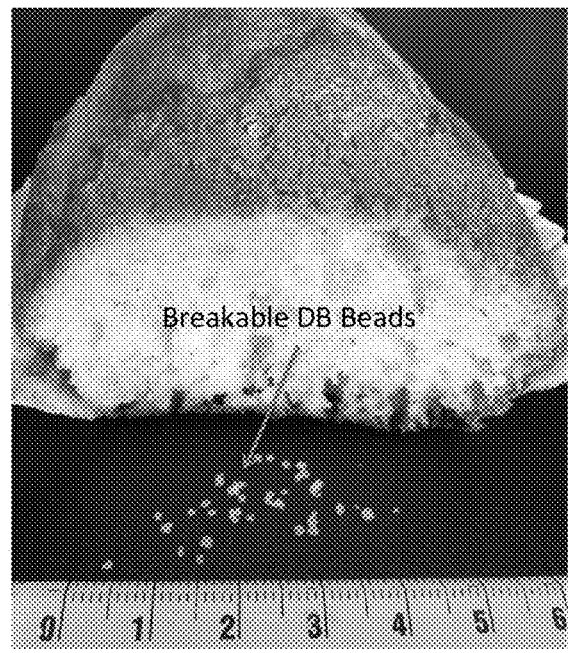
FIG. 13. Breakable high density beads (DB) loaded with limonene collected from pancakes during chewing.

FIG. 12 shows thermal release profile of loaded aroma in both conventional and DB formulations. FIGS. 12 A and B show that DB are of higher thermal stability compared with conventional alginate beads loaded with Thymol. In both, dry and wet state, about 90% of thymol has been lost at temperatures between 40-110° C. from conventional alginate beads (CB-Thymol wet and dry conditions). In this case, peak release was between 70-90° C., circled numbers table 20. However, DB loaded with thymol, showed a higher thermal stability at higher temperatures where about 85% of the total loaded thymol has peak release at 220-230° C. (see table 20, circled numbers). Table 20 shows the individual percentage of thymol release at each temperature.

TABLE 20

| Temperature (° C.) | Thymol loss %/temperature | | | |
|---|---|---|---|---|
| | DB-Thymol: Dry conditions | CB-Thymol: Dry conditions | DB-Thymol: Wet conditions | CB-Thymol: Wet conditions |
| 30 | 0 | 0 | 0 | 0 |
| 40 | 0 | 2 | 0 | 2 |
| 50 | 0 | 5 | 0 | 5 |
| 60 | 3 | 7 | 3 | 15 |
| 70 | 1 | 7 | 3 | (60) |
| 80 | 1 | 10 | 5 | 13 |
| 90 | 0 | (38) | 2 | 0 |
| 100 | 0 | 20 | 4 | 0 |
| 110 | 0 | 0 | 3 | 0 |
| 120 | 0 | 0 | 4 | 0 |
| 130 | 0 | 0 | 0 | 0 |
| 140 | 0 | 0 | 0 | 0 |
| 150 | 0 | 0 | 0 | 0 |
| 160 | 0 | 0 | 0 | 0 |
| 170 | 0 | 0 | 0 | 0 |
| 180 | 1 | 5 | 0 | 0 |
| 190 | 2 | 6 | 4 | 0 |
| 200 | 1 | 0 | 5 | 5 |
| 210 | 6 | 0 | 6 | 0 |
| 220 | (40) | 0 | (30) | 0 |
| 230 | (35) | 0 | (25) | 0 |
| 240 | 10 | 0 | 8 | 0 |
| 250 | 0 | 0 | 0 | 0 |
| 260 | 0 | 0 | 0 | 0 |
| 270 | 0 | 0 | 0 | 0 |
| 280 | 0 | 0 | 0 | 0 |
| 290 | 0 | 0 | 0 | 0 |
| 300 | 0 | 0 | 0 | 0 |

Example 11. Flavor Retention During Baking of Pancake Using D-Limonene as Flavor Model Materials and Methods Both conventional (CB) and DB were loaded with D-limonene as described in example 8. Beads loaded with D-limonene were prepared using PG. Dry formulations were obtained and the size fraction of 400-500 µm was selected to perform the thermal stability test in bakery.

The encapsulation efficiency of D-limonene was assayed as previously described by gas chromatography (Example 8).

The pancakes were prepared according to the following recipe:

| Ingredient | Amount (g) |
|---|---|
| Wheat Flour | 200 |
| Liquid Milk | 350 |
| Whole Eggs | 120 |
| Sesame Oil | 10 |
| Tetra sodium pyrophosphate | 0.3 |
| Sodium bicarbonate | 0.6 |
| Flavours D-limonene (free and loaded in Formulations) | Q |

1. Flour was added into a large container, and then the necessary amounts of eggs and milk were incorporated. The mixture was stirred until a smooth paste was obtained.
2. Sesame Oil was incorporated into the paste and subsequently whisked thoroughly.
3. Tetra sodium pyrophosphate and Sodium bicarbonate were added and mixed.
4. Flavour was added and mixed during 5 min.
5. The mix was baked in individual pans at 200° C. for 15 min.

The final concentration of flavour was 0.2% w/w in pancake (Q recipe table). Formulations loaded with flavour and free flavour were added to pancakes at final step.

Dry formulations of size between 400-500 µm have been selected to perform the organoleptic evaluation. For this purpose, 10 persons were asked to realize organoleptic evaluated of individual pancakes one day post baking. Parameters were: (i) smell grade (perception by sniff from 0-10 score) and taste (perception by mouth from 0-10 score). Pancake samples were stored at 25° C. for one months in closed plastic bags. Then, the organoleptic evaluation was realized by the same persons.

Finally, persons were asked to record the duration of the taste in the mouth in seconds.

The amount of D-limonene was assayed pre and post baking. For this purpose, 10 ml of distilled water was added to 5 g pancakes. Then, 30 ml methanol was added and the mixture was centrifuged at 3000 rpm for 20 min for further assay by gas chromatography. The % of lost limonene post packing as the following equation and expressed as the % of lost limonene post packing (w/w):

% of lost limonene post baking (w/w)=(Initial amount added before backing−Residual amount of limonene found in baked pancakes)×100

Results

The results of the organoleptic evaluation show that DB loaded with limonene reduced flavour loss during baking process compared with CB and free limonene (table 21). Both smell and taste of limonene perception were higher in case of DB. Similar results were obtained one month post baking (table 22).

TABLE 21

Organoleptic assay after one day of baking

| Person | Free limonene | CB loaded with limonene Smell | DB loaded with limonene | Free limonene | CB loaded with limonene Taste | DB loaded with limonene |
|---|---|---|---|---|---|---|
| 1 | 3 | 5 | 5 | 3 | 2 | 8 |
| 2 | 2 | 2 | 4 | 2 | 2 | 6 |
| 3 | 4 | 4 | 6 | 4 | 3 | 7 |
| 4 | 3 | 3 | 6 | 3 | 4 | 8 |
| 5 | 2 | 3 | 4 | 3 | 3 | 6 |
| 6 | 1 | 2 | 4 | 5 | 4 | 7 |
| 7 | 1 | 2 | 5 | 4 | 4 | 8 |
| 8 | 4 | 5 | 4 | 5 | 5 | 8 |
| 9 | 3 | 1 | 5 | 3 | 3 | 8 |
| 10 | 3 | 1 | 3 | 4 | 2 | 7 |
| Mean | 2.6 | 2.8 | 4.6 | 3.6 | 3.2 | 7.3 |

TABLE 22

Organoleptic assay after two month of baking

| Person | Free limonene | CB loaded with limonene Smell | DB- loaded with limonene | Free limonene | CB loaded with limonene Taste | DB- loaded with limonene |
|---|---|---|---|---|---|---|
| 1 | 3 | 2 | 4 | 2 | 2 | 7 |
| 2 | 2 | 2 | 4 | 1 | 2 | 6 |
| 3 | 4 | 3 | 4 | 4 | 2 | 7 |
| 4 | 3 | 2 | 3 | 3 | 1 | 8 |
| 5 | 4 | 1 | 5 | 1 | 0 | 6 |
| 6 | 3 | 1 | 5 | 2 | 0 | 6 |
| 7 | 3 | 2 | 5 | 3 | 1 | 5 |
| 8 | 2 | 3 | 6 | 5 | 3 | 8 |
| 9 | 2 | 3 | 5 | 3 | 2 | 6 |
| 10 | 3 | 4 | 4 | 3 | 2 | 8 |
| Mean | 2.9 | 2.3 | 4.5 | 2.7 | 1.5 | 6.7 |

The results of the organoleptic analysis are in agreement with the amount of lost flavour that has been found for formulations and free limonene (Tables 23 and 24). The flavor retention post baking was about 96% in case of DB. On the other hand, flavour retention of both free and encapsulated limonene in GB has been found to be very low (about 10-12%).

TABLE 23

The % of lost limonene one day post packing (w/w)

| | Free limonene | CB loaded with limonene | DB-loaded with limonene |
|---|---|---|---|
| Mean | 89.56 | 82.78 | 7.34 |

TABLE 24

The % of lost limonene one month post packing (w/w)

| | Free limonene | CB loaded with limonene | DB-loaded with limonene |
|---|---|---|---|
| Mean | 93.23 | 85.9 | 7.56 |

In addition, it has been observed that the encapsulation of flavour (D-limonene) in DB, increase the residence time of the taste in the mouth to be about 20 times more than CB and free flavour, achieving about 6.5 min taste duration (table 25).

TABLE 25

Taste duration (seconds) after one day of baking

| Person | Free limonene | CB loaded with limonene | DB-loaded with limonene |
|---|---|---|---|
| | | Taste | |
| 1 | 15 | 20 | 250 |
| 2 | 20 | 20 | 300 |
| 3 | 25 | 20 | 400 |
| 4 | 10 | 20 | 350 |
| 5 | 15 | 25 | 450 |
| 6 | 25 | 15 | 350 |
| 7 | 30 | 20 | 400 |
| 8 | 30 | 35 | 500 |
| 9 | 20 | 20 | 500 |
| 10 | 20 | 15 | 600 |
| Mean | 21 | 21 | 410 |

Example 12. Flavour Retention During Baking of Pancake Using D-Limonene as Flavor Model from Beads Prepared by Emulsion Technique Both, conventional and DB were loaded with D-limonene as described in example 9 using PG. Dry formulations of size between 400-500 μm have been selected to perform the test. Then, the organoleptic evaluation in pancakes was performed as example 11.

TABLE 26

Organoleptic assay after one day of baking

| Person | Free limonene | CB loaded with limonene Smell | DB loaded with limonene | Free limonene | CB loaded with limonene Taste | DB loaded with limonene |
|---|---|---|---|---|---|---|
| 1 | 3 | 3 | 4 | 3 | 1 | 9 |
| 2 | 3 | 2 | 6 | 3 | 3 | 8 |
| 3 | 4 | 2 | 5 | 3 | 3 | 7 |
| 4 | 2 | 5 | 4 | 4 | 3 | 7 |
| 5 | 2 | 3 | 5 | 5 | 4 | 7 |
| 6 | 3 | 2 | 6 | 5 | 5 | 8 |
| 7 | 3 | 2 | 4 | 4 | 5 | 9 |
| 8 | 3 | 2 | 5 | 4 | 4 | 9 |
| 9 | 5 | 3 | 5 | 3 | 3 | 9 |
| 10 | 2 | 3 | 4 | 2 | 4 | 8 |
| Mean | 3 | 2.7 | 4.8 | 3.6 | 3.5 | 8.1 |

Example 13. Flavour Retention During Baking of Pancake Using D-Limonene as Flavor Model Using MCT Oil

TABLE 27

Organoleptic assay after one day of baking

| Person | Free limonene | CB loaded with limonene Smell | DB loaded with limonene | Free limonene | CB loaded with limonene Taste | DB loaded with limonene |
|---|---|---|---|---|---|---|
| 1 | 3 | 4 | 4 | 3 | 5 | 9 |
| 2 | 1 | 2 | 6 | 3 | 6 | 7 |
| 3 | 2 | 1 | 4 | 4 | 4 | 8 |
| 4 | 3 | 2 | 4 | 2 | 6 | 6 |
| 5 | 3 | 3 | 4 | 3 | 6 | 9 |
| 6 | 2 | 4 | 6 | 3 | 6 | 9 |
| 7 | 5 | 3 | 4 | 2 | 6 | 9 |
| 8 | 3 | 3 | 4 | 4 | 7 | 9 |
| 9 | 2 | 2 | 4 | 5 | 5 | 8 |
| 10 | 4 | 3 | 4 | 3 | 5 | 9 |
| Mean | 2.8 | 2.7 | 4.4 | 3.2 | 5.6 | 8.3 |

Both conventional and DB were loaded with D-limonene as described in example 10 using PG. Dry formulations of size between 400-500 μm have been selected to perform the test. Then, the organoleptic evaluation in pancakes was realized as example 11.

Example 14. Flavour Retention During Baking of Pancake Using D-Limonene as Flavor Model Using Breakable Beads Model Materials and Methods Both conventional (CB) and DB were loaded with D-limonene and prepared as described in example 8 using PG. Dry formulations were obtained and the size was around 500-700 μm. This size has been selected to allow the detection of breakable beads in the mouth during and post chewing of pieces of pancakes.

On the other hand, persons were asked to check the presence of small beads in pancakes during slow chewing. If so, persons were asked to try to collect these beads in between tongue and teeth and to break these beads in the mouth and then to score the individual taste intensity and the physical properties of each bead (Hardness and breakability & bead texture). Finally, the size of the detected beads was assayed by optical microscopy (4× and 10× objectives).

Results

Table 28 shows detection of breakable beads in people's mouths post chewing pieces of pancake. However, they were not able to detect individual conventional beads in case of conventional beads (CB). The physical properties and breakability indicated similar properties to core shell oil containing microcapsules structure.

In addition, the taste of detected DB was strong (8 score: table 28) which indicated the minimum loss of flavor post backing. Finally, the size of the detected beads was about 0.8-1.2 mm. This slight increase of the particles size was due to the swelling of the beads during baking and chewing.

TABLE 28

Detection and taste score of breakable beads post chewing

CB loaded with limonene

| Person | Presence of particles | Physical properties | Taste of individual particles | Size (mm) |
|---|---|---|---|---|
| 1 | NO | 0 | 0 | — |
| 2 | NO | 0 | 0 | — |
| 3 | NO | 0 | 0 | — |
| 4 | NO | 0 | 0 | — |

TABLE 28-continued

Detection and taste score of breakable beads post chewing

| | | | | |
|---|---|---|---|---|
| 5 | NO | 0 | 0 | — |
| 6 | NO | 0 | 0 | — |
| 7 | NO | 0 | 0 | — |
| 8 | NO | 0 | 0 | — |
| 9 | NO | 0 | 0 | — |
| 10 | NO | 0 | 0 | — |
| Mean | — | — | — | — |

DB-loaded with D-limonene

| Person | Presence of beads | Physical characteristics post chewing | Taste of individual particles | Size (mm) |
|---|---|---|---|---|
| 1 | YES | Gummy, easily break in mouth | 9 | 0.9 |
| 2 | YES | Gummy, easily break in mouth | 8 | 1 |
| 3 | YES | Gummy, easily break in mouth | 7 | 0.9 |
| 4 | YES | Gummy, easily break in mouth | 9 | 0.85 |
| 5 | YES | Gummy, easily break in mouth | 7 | 0.8 |
| 6 | YES | Gummy, easily break in mouth | 8 | 1.1 |
| 7 | YES | Gummy, easily break in mouth | 7 | 0.9 |
| 8 | YES | Gummy, easily break in mouth | 8 | 1.1 |
| 9 | YES | Gummy, easily break in mouth | 9 | 1 |
| 10 | YES | Gummy, easily break in mouth | 8 | 0.9 |
| Mean | — | — | 8 | 0.945 |

Example 15. Flavor Retention During Baking of Pancake Using D-Limonene as Flavor Model Using Mixture of Alginate and Other Calcium Non-Cross Linkable Polysaccharides Both conventional and DB were loaded with D-limonene as example 8 using PG. In this case, combination between alginate and polysaccharides has been used as described in example 6. Ratios alginate: polysaccharides powder mix used to obtain DB were: alginate with xanthan gum (XGDB70:30), alginate with guar gum (GGDB70:30) and alginate with carrageenan (CRDB70:30). Dry formulations were obtained and the size fraction selected to perform the test was around 400-500 μm.
Results
The organoleptic properties of DB obtained from alginate and different non-cross-linkable polysaccharides combination have demonstrated higher capacities for flavor retention and higher thermal stabilities post baking compared to free flavor. The highest score has been obtained for guar gum (GGDB70:30) or carrageenan (CRDB70:30). In this case, both taste scores were very high (more than 9). However, smell perceptions were similar for all types of DB and usually higher than free flavor.

Table 29

Organoleptic assay one day post baking

| Person | Free limonene | XGDB70:30 | CRDB70:30 | GGDB70:30 | STDB70:30 |
|---|---|---|---|---|---|
| | | | Smell | | |
| 1 | 3 | 4 | 5 | 4 | 4 |
| 2 | 3 | 4 | 5 | 5 | 4 |
| 3 | 2 | 5 | 5 | 5 | 4 |
| 4 | 4 | 5 | 5 | 6 | 5 |
| 5 | 3 | 3 | 6 | 4 | 4 |
| 6 | 3 | 6 | 6 | 4 | 5 |
| 7 | 2 | 5 | 4 | 4 | 6 |
| 8 | 4 | 5 | 4 | 5 | 3 |
| 9 | 4 | 5 | 5 | 4 | 3 |
| 10 | 7 | 6 | 5 | 5 | 4 |
| Mean | 3.5 | 4.8 | 5 | 4.6 | 4.2 |
| | | | Taste | | |
| | 4 | 7 | 10 | 10 | 6 |
| | 2 | 7 | 10 | 9 | 7 |
| | 3 | 8 | 10 | 10 | 7 |
| | 2 | 7 | 9 | 10 | 8 |
| | 3 | 6 | 9 | 9 | 8 |
| | 1 | 7 | 8 | 9 | 7 |
| | 3 | 8 | 9 | 9 | 6 |
| | 3 | 9 | 9 | 8 | 7 |
| | 3 | 9 | 8 | 8 | 6 |
| | 5 | 8 | 9 | 9 | 6 |
| Mean | 2.9 | 7.6 | 9.1 | 9.1 | 6.8 |

Example 16. Flavor Retention During Baking of Pizza Bread Base Using *Origanum* Oil as Flavor Model Materials and Methods Both conventional and DB loaded with *Origanum* oil were prepared as described in example 11. The amount of *Origanum* oil free or loaded formulations were 0.2% w/w (oil/pizza base). Organoleptic characteristics were evaluated as described before by 10 volunteers.

To calculate the residual percentage of oil loss post baking, the amount of *Origanum* oil was measured using chromatographic analysis. For this purpose, 10 g of the previously pizza matrix were weighed into a suitable container. Then, 60 mL of methanol were added and the mixture was subjected to vigorous stirring and subsequently placed in an ultrasonic bath for 15 minutes. The sample was filtered through 0.22 μm syringe membranes prior to analysis. Then *Origanum* oil was quantified by means of HPLC-UV. An Agilent 1260 Infinity system equipped with a high sensitivity flow cell and a thermostatized column compartment was used. The injection volume was 20 μL of the extracted samples were injected onto an Agilent Zorbax SB-C18 column set at 25° C. The mobile phase was a mixture of ACN:H2O (50:50) pumped at 2.0 mL/min. The detection was performed at 278 nm. The analyte was eluted at 6.7 min.
PIZZA ingredients

| Ingredient | Amount (g) |
|---|---|
| Flour | 250 |
| Water | 165 |
| Sugar | 5 |
| Salt | 7.5 |
| Yeast (*Saccharomyces cerevisiae*) | 5 |
| Oil | 15 |

1. The yeast was dissolved in water and subsequently left to stand for approximately 5 minutes.
2. Necessary amounts of flour and salt were added and the mixture is stirred with a spatula until a rough dough is obtained.
3. The dough was kneaded for approximately 5 minutes using a mixer set at medium speed
4. The previously obtained dough was left to rise for 60 to 90 minutes at room temperature and the oven preheated to about 200° C.
5. The dough was baked for 5 to 10 minutes.

Results

Results of the organoleptic evaluation (table 30) show that DB loaded with *Origanum* oil enhance both taste and smell of pizza post baking process compared with CB and free oil (table 30). Both smell and taste of *Origanum* oil perception were higher in case of DB. These results have been corroborated by the assay of the percentage of oil loss post baking. Table 31 shows that the percentage of *Origanum* oil loss was about 80% and 60% for free oil and for CB respectively. However, only 7% of *Origanum* oil has been lost by backing in case of DB.

Conventional alginate beads loaded with *Rhizobium* were prepared as described before. Briefly, 2 g of MV alginate were dissolved in 40 mL PBS containing bacterial inoculum and 30 g Zeolite (particles size 5-7 μm). Then beads were obtained by dipping alginate solution in calcium chloride solution to obtain cross-linked alginate beads. Finally, beads were washed with distilled water and recollected for further drying by fluid bed dryer In order to determine the loading capacity and the bacterial survival among different alginate-based formulations, approximately 40 mg of each formulation were weighted and the bacteria were released using a dissolving buffer (2.65 g $Na_2CO_3$ and 9.605 g Citric acid for 1 L of the buffer, pH=7). The samples were agitated until the complete dissolution of the particles. Once the beads were broken down, the solution was diluted, plated out and the plates were incubated for 3 days at 30° C. After that, the bacteria were counted and the results were expressed as cfu/g.

Results

Table 32 indicates that the incorporation of *Rhizobium* in DB results in a higher bacteria viability even after 40 and 124 days at 25° C.

TABLE 30

Organoleptic assay 10 min post baking of pizza base

| Person | Free Origanum oil Smell | CB loaded with Origanum oil Smell | DB loaded with Origanum oil Smell | Free Origanum oil Taste | CB loaded with Origanum oil Taste | DB loaded with Origanum oil Taste |
|---|---|---|---|---|---|---|
| 1 | 4 | 5 | 3 | 4 | 3 | 10 |
| 2 | 5 | 5 | 3 | 4 | 3 | 10 |
| 3 | 4 | 4 | 4 | 3 | 4 | 9 |
| 4 | 1 | 4 | 4 | 3 | 4 | 9 |
| 5 | 3 | 5 | 6 | 3 | 5 | 10 |
| 6 | 3 | 3 | 6 | 4 | 4 | 8 |
| 7 | 2 | 3 | 7 | 4 | 4 | 8 |
| 8 | 3 | 4 | 7 | 4 | 3 | 10 |
| 9 | 3 | 4 | 6 | 3 | 4 | 10 |
| 10 | 5 | 3 | 5 | 3 | 5 | 8 |
| Mean | 3.3 | 4 | 5.1 | 3.5 | 3.9 | 9.2 |

TABLE 31

|  | % Pre baking Origanum oil/100 g pizza base (w/w) | % Post baking Origanum oil/100 g pizza base (w/w) | % Loss Origanum oil (w/w) |
|---|---|---|---|
| Free Origanum oil | 0.2 | 0.034 | 83.00 |
| CB loaded Origanum | 0.2 | 0.084 | 58.00 |
| DB-loaded with Origanum | 0.2 | 0.186 | 7.00 |

Example 17: Encapsulation of Bacteria in Alginate DB

Materials and Methods

For the preparation of DB-loaded with *Rhizobium* spp strain mix, 40 mL of water were slowly added to 30 g MV alginate under high shear mixing, as example 1. Then 40 mL PBS containing bacterial inoculum and 30 gr Zeolite (particles size 5-7 μm) were added under high shear mixing for 15 min. Then the beads were cross-linked using calcium chloride as in example 1. Finally, cross-linked hydrated beads were washed by distilled water and recollected by filtration for further drying by fluid bed dryer.

TABLE 32

Bacterial protection after particles storage at 25° C.

| Formulation code | Bacteria load (log CFU/g) Initial | After 40 days at 25° C. | After 124 days at 25° C. | Logarithmic reduction (log CFU/g) | Bacteria survival reduction after 40 days at 25° C. Bacteria reduction (%) |
|---|---|---|---|---|---|
| Conventional beads loaded with *Rhizobium* spp strain | 8.16 | 5.66 | nd | 2.50 | 99.7 |
| DB loaded with *Rhizobium* spp strain | 8.03 | 7.95 | 7.63 | 0.08 | 16.7 |

Nd: not determined

The invention claimed is:

1. A process for preparing alginate gel beads comprising an active ingredient, wherein the process comprises:
   a. mixing a dry alginate salt with a liquid, wherein the liquid is selected from the group consisting of: (i) an aqueous solution, (ii) an oil in water emulsion and (iii)

an aqueous suspension, at a ratio between the dry alginate salt and the liquid ranging between 1:5 and 1:0.4 w/w, b. adding an active ingredient to the mixture obtained in step (a) and c. adding a salt of a water soluble divalent or trivalent cation, thereby obtaining alginate gel beads or wherein the process alternatively comprises, a. mixing a dry alginate salt with a liquid, wherein the liquid is selected from the group consisting of: (i) an aqueous solution, (ii) an oil in water emulsion and (iii) an aqueous suspension, at a ratio between the dry alginate salt and the liquid ranging between 1:5 and 1:0.4 w/w, wherein the liquid further comprises an active ingredient, and b. adding a salt of a water soluble divalent or trivalent cation, thereby obtaining alginate gel beads.

2. The process according to claim 1, further comprising isolating the obtained alginate gel beads by filtration.

3. The process according to claim 1, further comprising drying the alginate gel beads.

4. The process according to claim 1, wherein the ratio between the alginate salt and the liquid in step (a) is between 1:4.5 and 1:0.5% (w/w).

5. The process according to claim 1, wherein the liquid is selected from the group consisting of:
(i) water,
(ii) a water solution including at least a water-miscible organic solvent, and
(iii) an oil in water emulsion, wherein the external phase contains surfactants alone or in combination with water miscible solvents.

6. The process according to claim 1, wherein mixing the dry alginate salt with the liquid is performed by addition of the dry alginate salt into the liquid at a flow rate of 20 mL/min under shear mixing between 1500 and 2000 rpm, or by addition of the liquid into the dry alginate salt at a flow rate of 20 mL/min under shear mixing between 1500 and 2000 rpm.

7. The process according to claim 1, wherein the divalent cation is calcium.

8. The process according to claim 1, wherein the dry alginate salt is mixed with at least one dry additional polysaccharide different from alginate before mixing the dry alginate salt with the liquid, and wherein the ratio of said additional polysaccharide and the alginate salt in the liquid is between 10:90 and 70:30 (w/w).

9. The process according to claim 1, wherein the active ingredient is an essential oil or a crystalline compound.

10. The process according to claim 9, wherein the essential oil is D-limonene or oregano oil and the crystalline compound is menthol or thymol.

11. The process according to claim 10, wherein the active ingredient is a bacterium of the genus *Rhizobium*.

12. An alginate gel bead comprising an active ingredient obtainable by the process according to claim 1.

13. A food product comprising the alginate gel bead according to claim 12.

14. A food additive comprising the alginate gel bead according to claim 12.

15. A dry surface comprising the alginate gel bead according to claim 12, wherein the active ingredient is a flavor and/or fragrance.

16. An additive comprising the alginate gel bead according to claim 12 for releasing a flavor and/or fragrance at a temperature between 200-240° C. from a dry surface.

* * * * *